US012732330B2

(12) United States Patent
Li

(10) Patent No.: US 12,732,330 B2
(45) Date of Patent: Sep. 8, 2026

(54) HYBRID AUTOMATIC REPEAT REQUEST ACKNOWLEDGEMENT FEEDBACK METHOD AND APPARATUS

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 317 days.

(21) Appl. No.: 18/553,974

(22) PCT Filed: Apr. 6, 2021

(86) PCT No.: PCT/CN2021/085742

§ 371 (c)(1),
(2) Date: Oct. 4, 2023

(87) PCT Pub. No.: WO2022/213289

PCT Pub. Date: Oct. 13, 2022

(65) Prior Publication Data

US 2024/0204958 A1 Jun. 20, 2024

(51) Int. Cl.
*H04L 5/00* (2006.01)
*H04L 1/1812* (2023.01)
*H04L 1/1829* (2023.01)

(52) U.S. Cl.
CPC .......... *H04L 5/0053* (2013.01); *H04L 1/1812* (2013.01); *H04L 1/1858* (2013.01)

(58) Field of Classification Search
CPC ... H04L 5/0053; H04L 1/1812; H04L 1/1858; H04L 5/0055; H04L 1/1854;
(Continued)

(56) References Cited

U.S. PATENT DOCUMENTS

2018/0368137 A1 12/2018 Yin et al.
2019/0159251 A1* 5/2019 Li .............................. H04L 1/18
(Continued)

FOREIGN PATENT DOCUMENTS

CN 106464351 A 2/2017
CN 110830151 A 2/2020
(Continued)

OTHER PUBLICATIONS

Office Action issued by the Intellectual Property India on May 19, 2025, in corresponding Application No. IN 202347074532, 6 pages.
(Continued)

*Primary Examiner* — Rushil P. Sampat
(74) *Attorney, Agent, or Firm* — Finnegan, Henderson, Farabow, Garrett & Dunner, L.L.P.

(57) ABSTRACT

A method for feeding back a hybrid automatic repeat request-acknowledgment (HARQ-ACK), performed by a terminal device, includes: receiving first indication information, wherein the first indication information is configured to indicate M non-continuous time units; receiving N physical downlink shared channels (PDSCHs) respectively over the M non-continuous time units; and transmitting HARQ-ACK feedback information corresponding to the N PDSCHs; wherein M and N are positive integers greater than 1, and N is less than or equal to M.

14 Claims, 6 Drawing Sheets

(58) Field of Classification Search
CPC ... H04L 1/1607; H04L 1/1671; H04L 1/1822; H04L 1/1861; H04L 1/1896; H04L 5/0094; H04W 72/1273; H04W 72/232
See application file for complete search history.

(56) References Cited

U.S. PATENT DOCUMENTS

| | | | | |
|---|---|---|---|---|
| 2020/0351035 | A1 | 11/2020 | Li et al. | |
| 2022/0052793 | A1* | 2/2022 | Bao | H04L 1/1822 |
| 2022/0095351 | A1* | 3/2022 | Baldemair | H04L 1/1887 |
| 2023/0231665 | A1* | 7/2023 | Wu | H04L 1/1854 370/329 |
| 2023/0371020 | A1* | 11/2023 | Wu | H04W 72/20 |

FOREIGN PATENT DOCUMENTS

| | | | | |
|---|---|---|---|---|
| CN | 111770572 | A | | 10/2020 |
| CN | 111865511 | A | | 10/2020 |
| CN | 112351504 | A | | 2/2021 |
| WO | WO 2020/141994 | A1 | | 7/2020 |
| WO | WO 2020221047 | A1 | * | 11/2020 |
| WO | WO 2020235884 | A1 | | 11/2020 |
| WO | WO 2022160355 | A1 | * | 8/2022 |

OTHER PUBLICATIONS

International Search Report of PCT Application No. PCT/CN2021/085742, mailed Apr. 16, 2024, issued by the State Intellectual Property Office of P.R. China as ISA.

"HARQ scheduling and feedback for NR-U", 3GPP TSG RAN WG1 Ad-Hoc Meeting #96bis, R1-1904183, Xi'an, China, Apr. 8-12, 2019, 12 pages.

Huawei, H., "HARQ enhancements in NR unlicensed", 3GPP TSG RAN WG1 Ad-Hoc Meeting #95, R1-1812196, Spokane, USA, Nov. 12-16, 2018, 13 pages.

Extended European Search Report for EP Application 21935525.2 dated Apr. 12, 2024, 7 pages.

"PDSCH/PUSCH enhancements", 3GPP TSG RAN WG1 Meeting #104-e, Tdoc R1-2101310, Online, Jan. 25-Feb. 5, 2021, 27 pages.

"Discussion on PDSCH/PUSCH enhancements for extending NR up to 71 GHz", 3GPP TSG RAN WG1 Meeting #104-e, R1-2100647, e-Meeting, Jan. 25-Feb. 5, 2021, 7 pages.

First Office Action issued by The State Intellectual Property Office of People's Republic of China on Jun. 1, 2022, in corresponding Application No. CN 202180001019, 5 pages.

Office Action issued by the Russian Federation Federal Institute of Industrial Property on Jun. 5, 2024, in corresponding Application No. RU 2023128218/07 (6 pages).

"On PDCCH, PUCCH and PUSCH enhancements", Ericsson, 3GPP TSG-RAN WG1 Meeting #104e R1-2101654, Jan. 26-Feb. 12, 2021, 23 pages.

Notice of Reasons for Refusal issued by the Japanese Patent Office on Sep. 25, 2024, in corresponding Application No. JP 2023-559687, 5 pages.

Moderator (LG Electronics), "Summary #1 of PDSCH/PUSCH enhancements (Scheduling/HARQ)", 3GPP TSG RAN WG1 #104-e, R1-2101799, e-Meeting, Jan. 25-Feb. 5, 2021, 10 pages.

Invitation to Respond to Written Opinion for Singapore Patent Application No. 11202307628X, dated Mar. 17, 2026, 13 pages.

* cited by examiner

HYBRID AUTOMATIC REPEAT REQUEST ACKNOWLEDGEMENT FEEDBACK METHOD AND APPARATUS

CROSS-REFERENCE TO RELATED APPLICATION

This application is the US national phase application of International Application No. PCT/CN2021/085742, filed on Apr. 6, 2021, the entire contents of which are incorporated herein by reference.

TECHNICAL FIELD

The present disclosure relates to a field of communication technologies, and particularly to a method and an apparatus for feeding back a hybrid automatic repeat request acknowledgment (HARQ-ACK).

BACKGROUND

In a communication system, for an unlicensed spectrum, a device needs to perform channel sensing on the unlicensed spectrum before transmitting data. When the device senses that a channel is idle, the device may determine a channel occupation time, and may transmit data on the unlicensed spectrum before the end of the channel occupation time. After the end of the channel occupation time, the device senses whether the channel is idle again.

Since the channel occupation time is limited, in order to save a control signaling, in the related art, it is proposed that one piece of downlink control information (DCI) may be used to schedule a plurality of continuous or a plurality of non-continuous time slots to achieve the indication of time domain resources.

SUMMARY

In a first aspect, a method for feeding back a hybrid automatic repeat request-acknowledgment (HARQ-ACK) is provided in embodiments of the disclosure. The method is performed by a terminal device, and includes: receiving first indication information, in which the first indication information is configured to indicate M non-continuous time units;

receiving N physical downlink shared channels (PDSCHs) respectively over the M non-continuous time units; and transmitting HARQ-ACK feedback information corresponding to the N PDSCHs;

in which M and N are positive integers greater than 1, and N is less than or equal to M.

In a second aspect, a method for feeding back a hybrid automatic repeat request-acknowledgment (HARQ-ACK) is provided in embodiments of the disclosure. The method is performed by a network device, and includes:

transmitting first indication information, in which the first indication information is configured to indicate M non-continuous time units;

transmitting N physical downlink shared channels (PDSCHs) respectively over the M non-continuous time units; and receiving HARQ-ACK feedback information corresponding to the N PDSCHs;

in which M and N are positive integers greater than 1, and N is less than or equal to M.

In a third aspect, a terminal device is provided in embodiments of the disclosure. The terminal device includes a processor and a memory configured to store a computer program. The processor is configured to:

receive first indication information, wherein the first indication information is configured to indicate M non-continuous time units;

receive N physical downlink shared channels (PDSCHs) respectively over the M non-continuous time units; and transmit HARQ-ACK feedback information corresponding to the N PDSCHs;

in which M and N are positive integers greater than 1, and N is less than or equal to M.

In a fourth aspect, a network device is provided in embodiments of the disclosure. The network device includes a processor and a memory configured to store a computer program. The processor is configured to perform the method in the second aspect.

BRIEF DESCRIPTION OF THE DRAWINGS

The drawings described in the disclosure will be briefly introduced below.

DETAILED DESCRIPTION

For ease of understanding, terms involved in the disclosure are introduced first.

1. Downlink Control Information (DCI)

The DCI may include uplink and downlink resource allocation, hybrid automatic repeat request (HARQ) information, power control, etc.

2. HARQ-Acknowledgment (ACK)

The HARQ-ACK is feedback information about whether a PDSCH is correctly received transmitted by a terminal device to a network device. A HARQ-ACK codebook is a HARQ-ACK feedback information sequence transmitted on a physical uplink control channel (PUCCH) or a physical uplink shared channel (PUSCH). Each bit corresponds to a transmission block (TB) or a code block group (CBG), and each bit indicates whether a corresponding TB or CBG is correctly received.

3. Subframe

In a communication system, time domain resources may be numbered continuously based on a system frame number (SFN) with a granularity of 10 millisecond (ms). One SFN may include 10 subframes, and each subframe is 1 ms in length. One subframe may be further divided into several slots, and a specific number depends on a subcarrier spacing.

In general, one slot may include 14 or 12 time division duplex orthogonal frequency division multiplexing (OFDM) symbols, regardless of the subcarrier spacing.

In addition, in order to fully utilize smaller resources, a mini-slot may also be used, and may start with any one OFDM symbol within one slot. A number of symbols included in the mini-slot is 1-14.

4. Physical Uplink Shared Channel (PUSCH)

The PUSCH may be configured to carry data from an uplink shared channel (USCH).

The PUCCH may be configured to carry uplink control information for reporting a state of a terminal device to a base station, such as HARQ-ACK feedback information and channel state information.

Physical Downlink Shared Channel (PDSCH)

The PDSCH may be used to carry data from a downlink shared channel (DSCH).

The sharing may be understood that a same physical channel may be time-shared by a plurality of users, or a channel has a shorter duration. A physical shared channel may be pre-established by a system and allocated to a certain terminal device for use in a certain manner according to service requirements of the terminal device.

In order to understand the method for determining a HARQ-ACK feedback disclosed in embodiments of the present disclosure better, a communication system to which embodiments of the present disclosure are applicable is described below.

Figure 1:
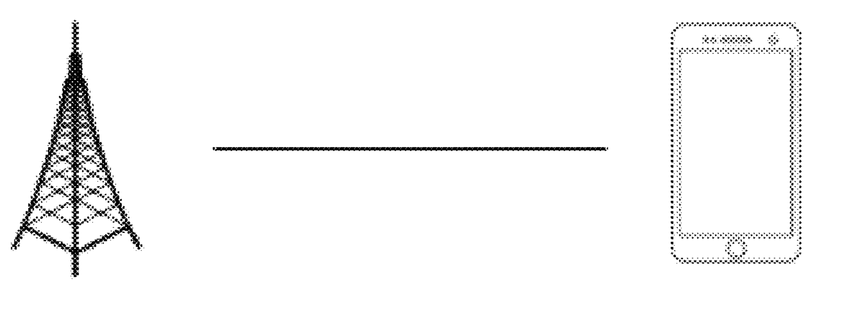
FIG. 1 is a diagram illustrating an architecture of a communication system provided in embodiments of the present disclosure.

As illustrated in FIG. 1, which is a diagram illustrating an architecture of a communication system provided in embodiments of the present disclosure. The communication system may include, but is not limited to, one network device and one terminal device, a number and a form of the devices shown in FIG. 1 are only for example and do not constitute a limitation to embodiments of the present disclosure, and two or more network devices and two or more terminal devices may be included in practical applications. The communication system as illustrated in FIG. 1 includes one network device 11 and one terminal device 12 for example.

It needs to be noted that the technical solution in embodiments of the present disclosure is applicable to various communication systems. For example, a long term evolution (LTE) system, a 5th generation (5G) mobile communication system, a 5G new radio (NR) system or other future new mobile communication systems.

The network device 11 in embodiments of the disclosure is an entity for transmitting or receiving a signal at a network side. For example, the network device 11 may be an evolved NodeB (eNB), a transmission reception point (TRP), a next generation NodeB (gNB) in a NR system, a base station in other future mobile communication systems, or an access node in a wireless fidelity (WiFi) system. A specific technology and a specific device form adopted by the network device are not limited in embodiments of the present disclosure. The network device provided in embodiments of the present disclosure may consist of a central unit (CU) and a distributed unit (DU). The CU may also be referred to as a control unit. The network device, such as a protocol layer of a base station, can be split by adopting a CU-DU structure. Functions of some protocol layers are centrally controlled by the CU, and functions of part or all of the remaining protocol layers are distributed in the DU, and the CU centrally controls the DU.

The terminal device 12 in embodiments of the disclosure is an entity for receiving or transmitting a signal at a user side, and for example, a mobile phone. The terminal device may be referred to as a terminal, a user equipment (UE), a mobile station (MS), a mobile terminal (MT), etc. The terminal device may be an automobile with a communication function, a smart automobile, a mobile phone, a wearable device, a tablet computer (Pad), a computer with a wireless transceiver function, a virtual reality (VR) terminal device, an augmented reality (AR) terminal device, a wireless terminal device in industrial control, a wireless terminal device in self-driving, a wireless terminal device in remote medical surgery, a wireless terminal device in smart grid, a wireless terminal device in transportation safety, a wireless terminal device in smart city, a wireless terminal in smart home, etc. A specific technology and a specific device form adopted by the terminal device are not limited in embodiments of the present disclosure.

In a communication system, for an unlicensed spectrum, a device needs to perform channel sensing on the unlicensed spectrum before transmitting data. When the device senses that a channel is idle, the device may determine a channel occupation time, and may transmit data on the unlicensed spectrum before the end of the channel occupation time. After the end of the channel occupation time, the device senses whether the channel is idle again.

Since the channel occupation time is limited, in order to save a control signaling, in the related art, it is proposed that one piece of downlink control information (DCI) may be used to schedule a plurality of continuous or a plurality of non-continuous time slots to achieve the indication of time domain resources. However, it is an urgent problem to be solved how to feed back hybrid automatic repeat requests (HARQs) of data corresponding to a plurality of slots.

It may be understood that, the communication system described in embodiments of the present disclosure are intended to explain technical solutions of embodiments of the present disclosure more clearly, and does not constitute a limitation to the technical solutions provided by embodiments of the present disclosure. Those skilled in the art know that, with evolution of a system architecture and emergence of a new business scenario, the technical solutions provided in embodiments of the present disclosure are equally applied to similar technical problems.

The method and the apparatus for feeding back a hybrid automatic repeat request acknowledgment (HARQ-ACK) provided in the disclosure are described in combination with attached drawings.

Figure 2:
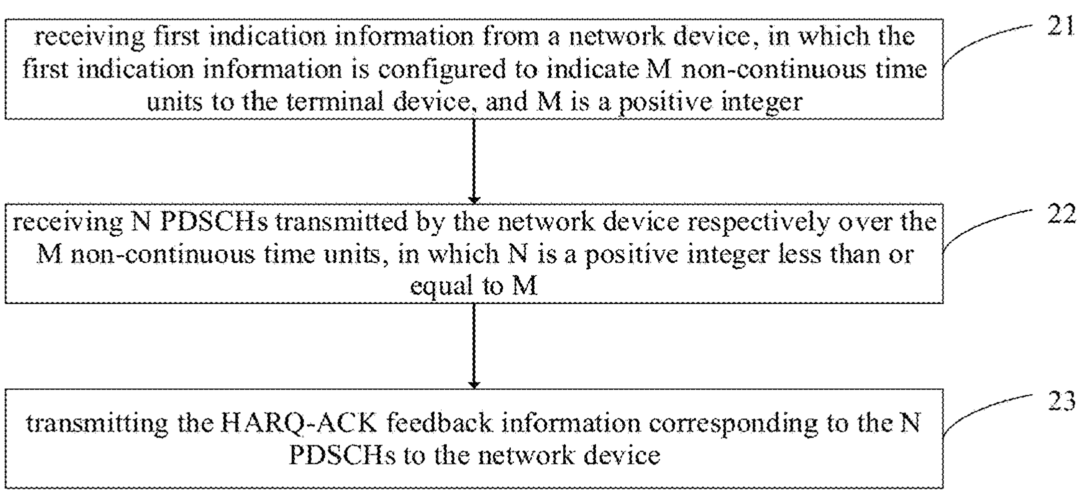
FIG. 2 is a flowchart illustrating a method for feeding back a hybrid automatic repeat request-acknowledgment (HARQ-ACK) in an embodiment of the present disclosure.

As illustrated in FIG. 2, which is a flowchart illustrating a method for feeding back a hybrid automatic repeat request-acknowledgment (HARQ-ACK) in an embodiment of the present disclosure. The method is configured to be performed by a terminal device. As illustrated in FIG. 2, the method may include but not limited to the following steps:

At step 21, first indication information from a network device is received. The first indication information is configured to indicate M non-continuous time units to the terminal device. M is a positive integer, In an implementation, the first indication information may be downlink control information (DCI), or, may be other any information that may be configured to indicate a plurality of non-continuous time units to the terminal device, which will not be limited in the present disclosure. When the first indication information is DCI, the first indication information is DCI corresponding to a DCI format for scheduling a PDSCH.

In an implementation, the M non-continuous time units may be at least one of: a downlink time unit or a flexible time unit. That is, the DCI corresponding to the DCI format for scheduling the PDSCH may only schedule the downlink time unit and/or the flexible time unit. And the DCI corresponding to the DCI format for scheduling the PUSCH may only schedule an uplink time unit and/or the flexible time unit.

The downlink time unit may only be configured for a downlink communication transmission, and the flexible time unit is a time unit without a determined transmission direction. And when the DCI format for scheduling the PDSCH transmission schedules the flexible time unit, the flexible time unit may be used for a PDSCH transmission.

In an implementation, the time unit may be at least one of a slot, a mini-slot, a symbol or a subframe.

At step 22, N PDSCHs transmitted by the network device are received respectively over the M non-continuous time units. N is a positive integer less than or equal to M.

In the disclosure, the terminal device may receive the PDSCH over the M non-continuous time units in response to receiving the M non-continuous downlink time units and/or flexible time units indicated by the network device.

The N PDSCHs received by the terminal device over the M non-continuous time units may be less than or equal to a number of non-continuous time units, that is, the terminal device may receive one PDSCH in one or more non-continuous time units, which is not limited in the disclosure.

In an implementation, each PDSCH includes at least one transmission block (TB); or, each PDSCH includes at least one transmission block (CBG), which is not limited in the present disclosure.

At step 23, the HARQ-ACK feedback information corresponding to the N PDSCHs is transmitted to the network device.

In an implementation, HARQ-ACKs of different TBs in each of the N PDSCHs correspond to different bits, or, HARQ-ACKs of different CBGs in each of the N PDSCHs correspond to different bits.

For example, each PDSCH includes one or two TBs, in which case, a HARQ-ACK of each TB in each PDSCH occupies an independent bit. Alternatively, each PDSCH includes a plurality of CBGs, in which case, a HARQ-ACK of each CBG in each PDSCH occupies an independent bit.

In the disclosure, when the terminal device receives a plurality of non-continuous time units indicated by the network device and receives the N PDSCHs transmitted by the network device respectively based on the plurality of non-continuous time units, the terminal device may transmit HARQ-ACK feedback information indicating whether the N PDSCHs are correctly received to the network device.

In embodiments of the present disclosure, when the terminal device receives first indication information from the network device first, the terminal device may receive N PDSCHs transmitted by the network device based on M non-continuous time units indicated based on the first indication information, and transmit HARQ-ACK feedback information corresponding to the N PDSCHs to the network device. Thus, the terminal device may determine a plurality of non-continuous time units based on the first indication information, and perform HARQ-ACK feedbacks for a plurality of PDSCHs received by the plurality of non-continuous time units, thereby effectively reducing a signaling transmission, saving resources and improving efficiency.

Figure 3:
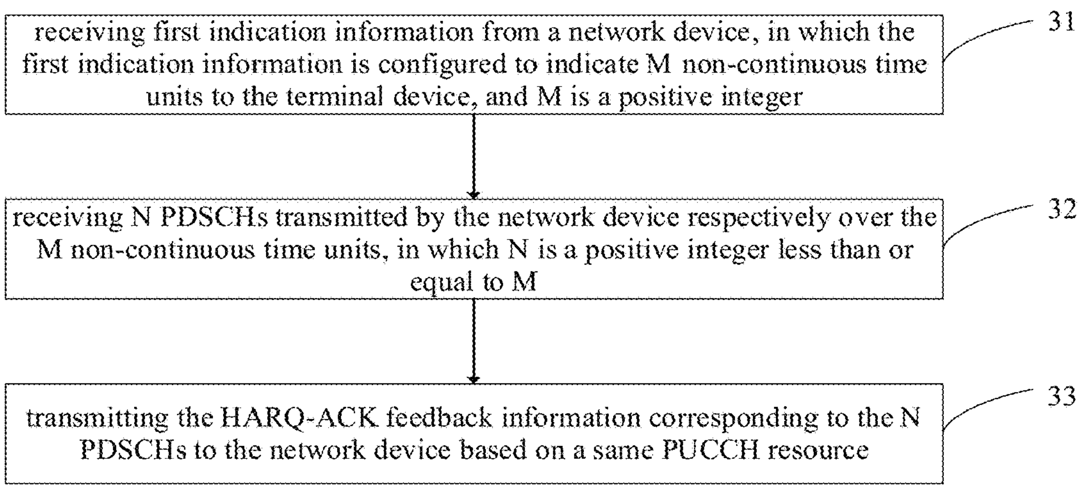
FIG. 3 is a flowchart illustrating a method for feeding back a hybrid automatic repeat request-acknowledgment (HARQ-ACK) in another embodiment of the present disclosure.

As illustrated in FIG. 3, which is a flowchart illustrating a method for feeding back a hybrid automatic repeat request-acknowledgment (HARQ-ACK) in an embodiment of the present disclosure. The method is configured to be performed by a terminal device. As illustrated in FIG. 3, the method may include but not limited to the following steps.

At step 31, first indication information from a network device is received. The first indication information is configured to indicate M non-continuous time units to the terminal device. M is a positive integer.

In an implementation, the first indication information may be downlink control information (DCI).

In an implementation, a plurality of non-continuous time units may be at least one of: a downlink time unit or a flexible time unit.

It needs to be noted that, specific contents and implementations of the first indication information and the plurality of non-continuous time units may refer to descriptions of other embodiments, which are not limited in the disclosure.

In an implementation, a number of the plurality of non-continuous time units indicated by the first indication information is less than or equal to a certain threshold value.

Specifically, if a number of the non-continuous time units is too large, and one piece of indication information is used for scheduling, a scheduling time may be too long, with poor flexibility, and channel state information based on scheduling may change too much, which may result in inaccuracy. Therefore, a number of the non-continuous time units indicated to the terminal device in the first indication information is limited, to reduce a signaling overhead as much as possible, and improve accuracy.

The threshold value may be a value indicated by the network device or may be a value preconfigured by the terminal device based on a protocol, which is not limited in the present disclosure.

At step 32, N PDSCHs transmitted by the network device are received respectively over the M non-continuous time units. N is a positive integer less than or equal to M.

At step 33, the HARQ-ACK feedback information corresponding to the N PDSCHs is transmitted to the network device based on a same PUCCH resource.

In an implementation, the terminal device may transmit the HARQ-ACK feedback information corresponding to the N PDSCHs to the network device based on a specified codebook in the same PUCCH resource. The HARQ-ACK feedback information corresponding to different PDSCHs corresponds to different bits or a same bit in the specified codebook.

The specified codebook may be a codebook determined by the terminal device based on a protocol or may be a codebook determined by the terminal device based on indication information of the terminal device, which is not limited in the present disclosure.

For example, when the network device transmits 5 PDSCHs to the terminal device, the terminal device may return whether each PDSCH is correctly received respectively to the network device based on 5 bits in the specified codebook.

Alternatively, when the network device transmits 5 PDSCHs to the terminal device and each PDSCH includes 2 TBs, the terminal device may return whether each TB in each PDSCH is correctly received respectively to the network device based on 10 bits in the specified codebook.

Alternatively, when the network device transmits 5 PDSCHs to the terminal device, the terminal device may return whether each PDSCH is correctly received to the network device based on 1 bit in the specified codebook, that is, 1 bit is used to feed back HARQ-ACK information of 5 PDSCHs. For example, if all PDSCHs are correctly received, a bit value may be set to 1, and if all PDSCHs are wrongly received, or if only one PDSCH is wrongly received, the bit value may be set to 0, which is not limited in the disclosure.

In embodiments of the present disclosure, when the terminal device receives first indication information from the network device, the terminal device may receive N PDSCHs transmitted by the network device based on M non-continuous time units indicated based on the first indication information, and transmit HARQ-ACK feedback information corresponding to the N PDSCHs to the terminal device based on the same PUCCH resource. Thus, the terminal device may determine a plurality of non-continuous time units based on the first indication information, and perform HARQ-ACK feedbacks for a plurality of PDSCHs received by a plurality of non-continuous time units by using the same PUCCH resource, thereby effectively reducing a signaling transmission, saving resources and improving efficiency.

Figures 4, 5:
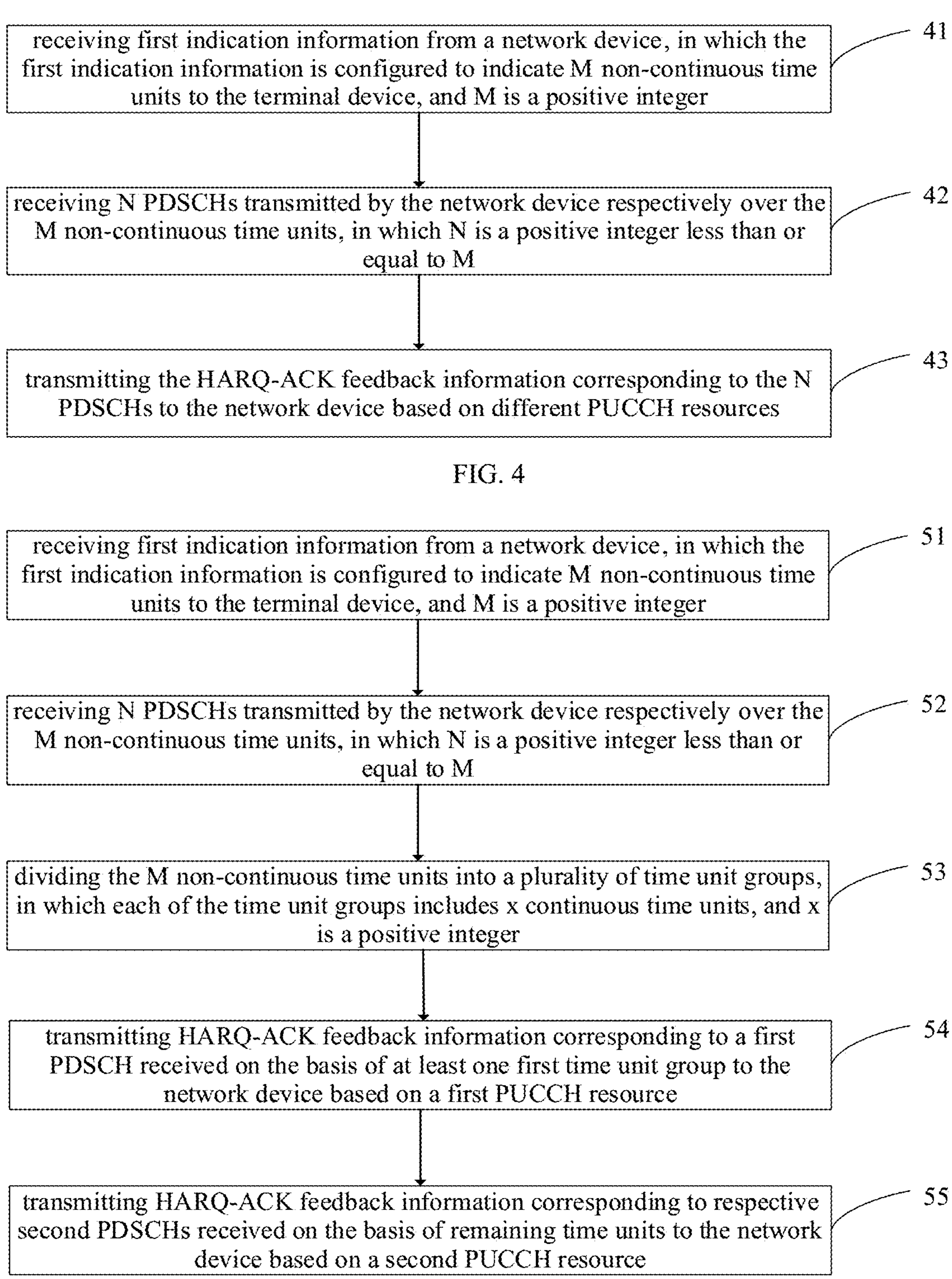
FIG. 4 is a flowchart illustrating a method for feeding back a hybrid automatic repeat request-acknowledgment (HARQ-ACK) in another embodiment of the present disclosure.
FIG. 5 is a flowchart illustrating a method for feeding back a hybrid automatic repeat request-acknowledgment (HARQ-ACK) in another embodiment of the present disclosure.

As illustrated in FIG. 4, which is a flowchart illustrating a method for feeding back a hybrid automatic repeat request-acknowledgment (HARQ-ACK) in an embodiment of the present disclosure. The method is configured to be performed by a terminal device. As illustrated in FIG. 4, the method may include but not limited to the following steps.

At step 41, first indication information from a network device is received. The first indication information is configured to indicate M non-continuous time units to the terminal device. M is a positive integer.

In an implementation, the first indication information may be downlink control information (DCI).

In an implementation, a plurality of non-continuous time units may be at least one of: a downlink time unit or a flexible time unit.

It needs to be noted that, specific contents of the first indication information and the plurality of non-continuous time units may refer to descriptions of other embodiments, which are not limited in the disclosure.

At step 42, N PDSCHs transmitted by the network device are received respectively over the M non-continuous time units. N is a positive integer less than or equal to M.

At step 43, the HARQ-ACK feedback information corresponding to the N PDSCHs is transmitted to the network device based on different PUCCH resources.

In an implementation, in the disclosure, the M non-continuous time units indicated in the first indication information may be divided into a plurality of time unit groups. Each time unit group includes x continuous time units, and a plurality of time unit groups may be continuous or non-continuous. An operation with respect to division of the M non-continuous time units into a plurality of time unit groups may be indicated to a terminal by the network device after completion, or may be performed by the terminal device based on a predefined rule and/or a rule indicated by the network device. The terminal device transmits HARQ-ACK feedback information corresponding to PDSCHs received based on different time unit groups to the network device based on different PUCCH resources when determining a plurality of time groups.

The terminal device may also transmit HARQ-ACK feedback information corresponding to a specified plurality of PDSCHs to the network device based on a same PUCCH resource. The time units corresponding to the specified plurality of PDSCHs belong to a same time unit group.

For example, if 10 non-continuous time units are indicated in the first indication information received by the terminal device, and a 1st time unit, a 2nd time unit and a 3rd time unit are continuous, the 3rd time unit and a 4th time unit are non-continuous, the 4th time unit, a 5th time unit, a 6th time unit and a 7th time unit are continuous, the 7th time unit and an 8th time unit are non-continuous, and the 8th time unit, a 9th time unit and a 10th time unit are continuous. Thus, the terminal device may divide the 10 non-continuous time units received into 3 time unit groups, that is, a 1st time unit group includes the 1st to 3rd time units, a 2nd time unit group includes the 4th to 7th time units, and a 3rd time unit group includes the 8th to 10th time units.

Then, the terminal device may transmit HARQ-ACK feedback information corresponding to PDSCHs received by the 1st time unit group (i.e., the 1st to 3rd time units) to the network device based on one PUCCH resource; transmit HARQ-ACK feedback information corresponding to PDSCHs received by the 2nd time unit group to the network device based on another PUCCH resource; and transmit HARQ-ACK feedback information corresponding to PDSCHs received by the 3rd time unit group to the network device based on another PUCCH resource.

In an implementation, a number x of time units included in each time unit group may be same, or may be different, or may be partially same, which is not limited in the disclosure.

In an implementation, the terminal device may determine, based on an instruction of the network device, the number x of time units included in each time unit group. Alternatively, the number of time units included in each time unit group may be determined based on a protocol. It is not limited in the present disclosure.

In an implementation, a number of time units included in each time unit group is greater than or equal to 1.

In an implementation, in the disclosure, the terminal device may further transmit HARQ-ACK feedback information corresponding to PDSCHs received on different time unit groups in the same PUCCH resource.

For example, the terminal device transmits HARQ-ACK feedback information corresponding to PDSCHs received by the 1st time unit group (i.e., the 1st to 3rd time units) to the network device based on a first PUCCH resource; transmit HARQ-ACK feedback information corresponding to PDSCHs received by the 2nd time unit group to the network device based on a second PUCCH resource; and transmit HARQ-ACK feedback information corresponding to PDSCHs received by the 3rd time unit group to the network device based on a third PUCCH resource. For example, the second PUCCH resource and the third PUCCH resource are a same PUCCH resource, and the first PUCCH resource and the second PUCCH resource are different PUCCH resources.

In embodiments of the present disclosure, when the terminal device receives first indication information from the network device first, the terminal device may receive N PDSCHs transmitted by the network device on the basis of M non-continuous time units indicated based on the first indication information, and transmit the HARQ-ACK feedback information corresponding to the N PDSCHs to the network device based on the different PUCCH resources. Thus, the terminal device may determine a plurality of non-continuous time units based on the first indication information, and perform HARQ-ACK feedbacks respectively for a plurality of PDSCHs received by the plurality of non-continuous time units by using the different PUCCH resources, thereby effectively reducing a signaling transmission, saving resources and improving efficiency.

As illustrated in FIG. 5, which is a flowchart illustrating a method for feeding back a hybrid automatic repeat request-acknowledgment (HARQ-ACK) in an embodiment of the present disclosure. The method is configured to be performed by a terminal device. As illustrated in FIG. 5, the method may include but not limited to the following steps.

At step 51, first indication information from a network device is received. The first indication information is configured to indicate M non-continuous time units to the terminal device. M is a positive integer.

In an implementation, the first indication information may be downlink control information (DCI).

In an implementation, a plurality of non-continuous time units may be at least one of: a downlink time unit or a flexible time unit.

It needs to be noted that, specific contents of the first indication information and the plurality of non-continuous time units may refer to descriptions of other embodiments, which are not limited in the disclosure.

At step 52, N PDSCHs transmitted by the network device are received respectively over the M non-continuous time units. N is a positive integer less than or equal to M.

At step 53, the M non-continuous time units are divided into a plurality of time unit groups. Each of the time unit groups includes x continuous time units, and x is a positive integer.

In an implementation, each of the plurality of time unit groups is non-continuous or continuous, which is not limited in the present disclosure.

It needs to be noted that, a meaning and a division of the time unit group may refer to descriptions of other embodiments, which is not limited in the disclosure.

At step 54, HARQ-ACK feedback information corresponding to a first PDSCH received on the basis of at least one first time unit group is transmitted to the network device based on a first PUCCH resource.

At step 55, HARQ-ACK feedback information corresponding to respective second PDSCHs received on the basis of remaining time units is transmitted to the network device based on a second PUCCH resource.

A transmitting moment corresponding to the first PUCCH resource is located before a transmitting moment corresponding to the second PUCCH resource, and a priority of the first PUCCH is higher than a priority of each of the second PUSCHs.

In an implementation, each of the at least one first time unit group is continuous or non-continuous.

That is, priorities of a plurality of first PDSCHs that may be received by the terminal device based on a plurality of continuous first time unit groups are same, or priorities of a plurality of first PDSCHs that may be received based on a plurality of non-continuous first time unit groups are same.

In an implementation, if priorities of PDSCHs received by the terminal device based on different time units are different, it may be preferentially ensured that HARQ-ACK feedback information corresponding to a PDSCH with a higher priority may be preferentially transmitted, so that the HARQ-ACK feedback information corresponding to the PDSCH with the higher priority may be transmitted by using a PUCCH resource at an early transmitting time, and then the HARQ-ACK feedback information corresponding to the PDSCH with the higher priority may be transmitted by using remaining PUCCH resources.

In an implementation, due to different types of service data, requirements for quality of service may be different, and for example, requirements for a delay are different. Therefore, the terminal device may determine a priority of each of the PDSCHs based on a service type corresponding to each of the PDSCHs received.

In embodiments of the present disclosure, when the terminal device receives first indication information from the network device first, the terminal device may receive N PDSCHs transmitted by the network device on the basis of M non-continuous time units indicated based on the first indication information, and transmit HARQ-ACK feedback information corresponding to a PDSCH with a higher priority to the terminal device based on a PUCCH resource at an early transmitting moment and transmit HARQ-ACK feedback information corresponding to a PDSCH with a lower priority to the terminal device based on a PUCCH resource at a late transmitting moment. Thus, the terminal device may determine a plurality of non-continuous time units based on the first indication information, and transmit a HARQ-ACK corresponding to a PDSCH with a higher priority by using the PUCCH resource at the early transmitting moment, thereby effectively reducing a signaling transmission, saving resources and ensuring qualities of service of PDSCHs with different priorities.

Figures 6, 7:
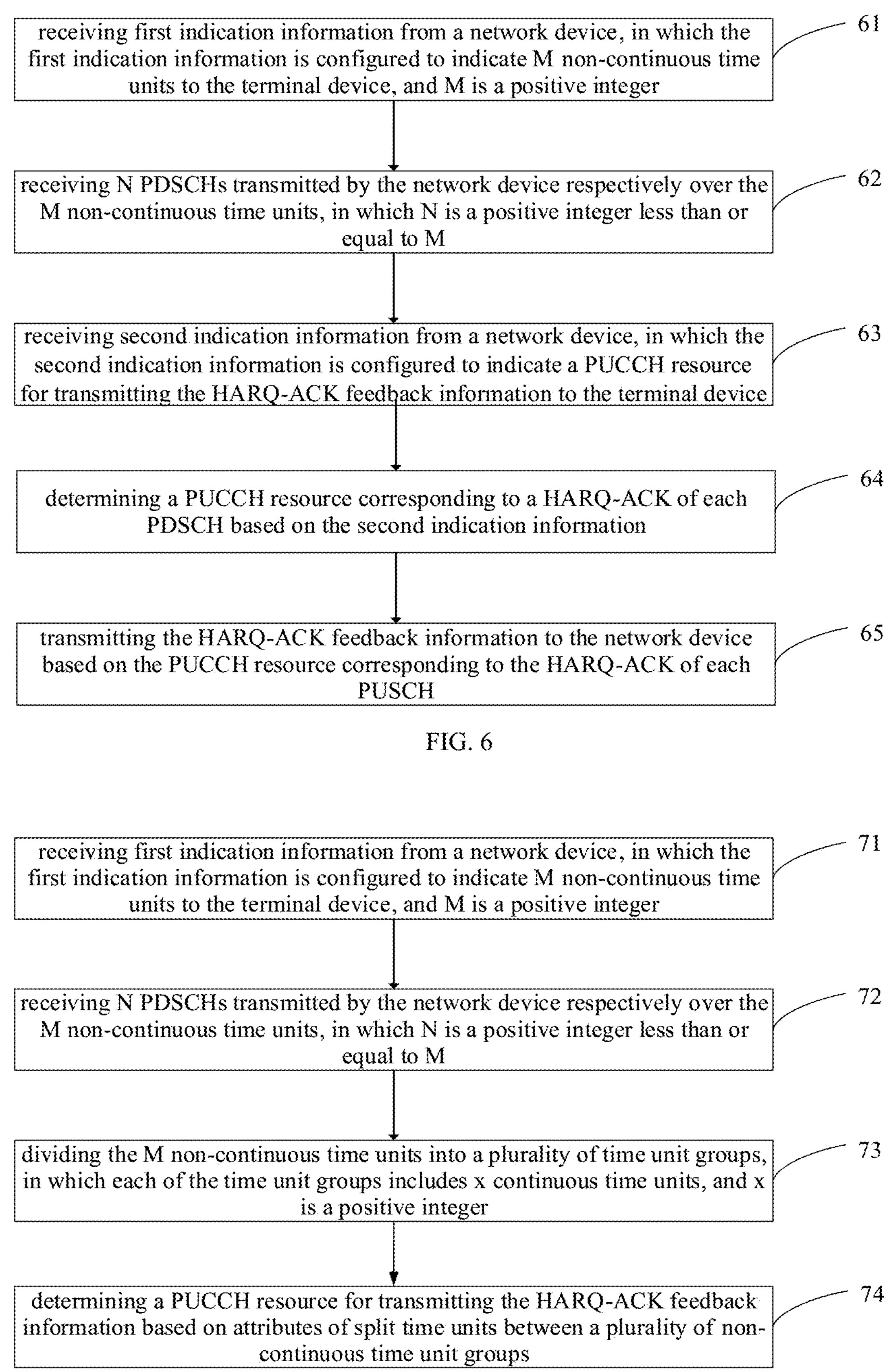
FIG. 6 is a flowchart illustrating a method for feeding back a hybrid automatic repeat request-acknowledgment (HARQ-ACK) in another embodiment of the present disclosure.
FIG. 7 is a flowchart illustrating a method for feeding back a hybrid automatic repeat request-acknowledgment (HARQ-ACK) in another embodiment of the present disclosure.

As illustrated in FIG. 6, which is a flowchart illustrating a method for feeding back a hybrid automatic repeat request-acknowledgment (HARQ-ACK) in an embodiment of the present disclosure. The method is configured to be performed by a terminal device. As illustrated in FIG. 6, the method may include but not limited to the following steps.

At step 61, first indication information from a network device is received. The first indication information is configured to indicate M non-continuous time units to the terminal device. M is a positive integer.

In an implementation, the first indication information may be downlink control information (DCI).

In an implementation, a plurality of non-continuous time units may be at least one of: a downlink time unit or a flexible time unit.

It needs to be noted that, specific contents of the first indication information and the plurality of non-continuous time units may refer to descriptions of other embodiments, which are not limited in the disclosure.

At step 62, N PDSCHs transmitted by the network device are received respectively over the M non-continuous time units. M is a positive integer less than or equal to N.

At step 63, second indication information from a network device is received. The second indication information is configured to indicate a PUCCH resource for transmitting the HARQ-ACK feedback information to the terminal device.

At step 64, a PUCCH resource corresponding to a HARQ-ACK of each PDSCH is determined based on the second indication information.

At step 65, the HARQ-ACK feedback information is transmitted to the network device based on the PUCCH resource corresponding to the HARQ-ACK of each PUSCH.

In an implementation, a PUCCH resource indicated by the second indication information may be one or more resources. That is, the terminal device may transmit HARQ-ACK feedback information corresponding to N PDSCHs to the network device based on one PUCCH resource; or may transmit HARQ-ACK feedback information corresponding to the N PDSCHs to the network device based on a plurality of PUCCH resources. It is not limited in the present disclosure.

In an implementation, the second indication information is first indication information, or the second indication information is other indication information other than the first indication information.

In embodiments of the present disclosure, the terminal device determines M non-continuous time units based on first indication information received first, and receives N PDSCHS transmitted by the network device based over the M non-continuous time units, and determines PUCCH resources corresponding to HARQ-ACKs of each PDSCH based on second indication information received, and transmits HARQ-ACK feedback information corresponding to the PUSCH to the network device based on the determined PUCCH resources. Thus, the terminal device may determine a plurality of non-continuous time units via the first indication information, and transmit a HARQ-ACK corresponding to a PDSCH with a higher priority to the network device based on the PUCCH resources indicated, thereby effectively reducing a signaling transmission, saving resources and ensuring qualities of transmission PDSCHs with different priorities.

As illustrated in FIG. 7, which is a flowchart illustrating a method for feeding back a hybrid automatic repeat request-acknowledgment (HARQ-ACK) in an embodiment of the present disclosure. The method is configured to be performed by a terminal device. As illustrated in FIG. 7, the method may include but not limited to the following steps.

At step 71, first indication information from a network device is received. The first indication information is configured to indicate M non-continuous time units to the terminal device. M is a positive integer.

In an implementation, the first indication information may be downlink control information (DCI).

In an implementation, a plurality of non-continuous time units may be at least one of: a downlink time unit or a flexible time unit.

It needs to be noted that, specific contents of the first indication information and the plurality of non-continuous time units may refer to descriptions of other embodiments, which are not limited in the disclosure.

At step 72, N PDSCHs transmitted by the network device are received respectively over the M non-continuous time units. N is a positive integer less than or equal to M.

At step 73, the M non-continuous time units are divided into a plurality of time unit groups. Each of the time unit groups includes x continuous time units, and x is a positive integer.

In an implementation, each of the plurality of time unit groups is non-continuous, which is not limited in the present disclosure.

It needs to be noted that, a meaning and a division of the time unit group may refer to descriptions of other embodiments, which is not limited in the disclosure.

At step 74, a PUCCH resource for transmitting the HARQ-ACK feedback information is determined based on attributes of split time units between a plurality of non-continuous time unit groups.

The attributes of the time units may be used to indicate a purpose of the time units. For example, the time unit is an uplink time unit, a flexible time unit or a downlink time unit.

In an implementation, in the disclosure, in response to any one time unit group being a time unit group corresponding to a PDSCH required to feed back the HARQ-ACK, and each time unit located behind any one time unit group being a non-downlink time unit, the terminal device may determine the non-downlink time unit as a time unit corresponding to the PUCCH resource. The non-downlink time unit refers to an uplink time unit and/or a flexible time unit.

For example, if 4 time unit groups are indicated to the terminal device in the first indication information, and a 2nd time unit group is a downlink time unit group, there are 2 uplink time units and/or flexible time units between the 2nd time unit group and the 3rd time unit group. That is, the terminal device may receive the PDSCH based on the 2nd time unit group and needs to feed back a HARQ-ACK for the 2nd time unit group. Therefore, the terminal device may determine at least one time unit in the 2 time units located behind the 2nd time unit group as a time unit corresponding to a PUCCH resource.

In an implementation, in response to any one time unit group being a time unit group corresponding to a PDSCH required to feed back the HARQ-ACK, and a plurality of time units located behind the any one time unit group including a plurality of non-downlink time units, a first non-downlink time unit in the plurality of non-downlink time units is determined as a time unit corresponding to the PUCCH resource.

For example, if 4 time unit groups are indicated to the terminal device in the first indication information, and the 2nd time unit group is a downlink time unit group, there are 6 time units between the 2nd time unit group and the 3rd time unit group, and the 1st and 4th to 6th time units in the 6 time units are non-downlink time units. That is, the terminal device may receive the PDSCH based on the 2nd time unit group and needs to feed back a HARQ-ACK for the 2nd time unit group. Therefore, the terminal device may determine a 1st time unit located behind the 2nd time unit group as a time unit corresponding to a PUCCH resource.

In an implementation, in response to any one time unit group being a time unit group corresponding to a PDSCH required to feed back the HARQ-ACK, and a plurality of time units located behind the any one time unit group being non-downlink time units, a non-downlink time unit with a time interval from the any one time unit group being greater than or equal to a specified value and being minimum is determined as a time unit corresponding to the PUCCH resource.

The terminal device may determine the specified value based on a performance of the device, that is, the specified value may be used to indicate a processing delay of the terminal device.

Alternatively, the terminal device may further receive third indication information transmitted by the network device, and then determine the specified value based on the third indication information. Alternatively, the terminal device may determine the specified value based on the protocol. It is not limited in the present disclosure.

Specifically, if the terminal device determines that the specific value is 2 time units, 4 time unit groups are indicated to the terminal device in the first indication information, and the 2nd time unit group is a downlink time unit group, there are 4 non-downlink time units between the 2nd time unit group and the 3rd time unit group. That is, the terminal device may receive the PDSCH based on the 2nd time unit group and needs to feed back a HARQ-ACK for the 2nd time unit group. Therefore, the terminal device may determine a non-downlink time unit with a time internal from the 2nd time unit group being greater than or equal to 2 time units and a time interval being minimum, located behind the 2nd time unit group, that is, a 3rd time unit, as a time unit corresponding to a PUCCH resource.

In an implementation, the terminal device may further determine the PUCCH resource for transmitting the HARQ-ACK feedback information based on the control resource set (CORESET).

The terminal device may determine the PUCCH resource for transmitting a HARQ-ACK corresponding to each of the PDSCHs based on a CORESET corresponding to each of the PDSCHs. The CORESET corresponding to each of the PDSCHs is a CORSET corresponding to a PUCCH for scheduling the PDSCH.

In an implementation, the terminal device may determine the PUCCH resource for transmitting the HARQ-ACK feedback information based on a number of CCEs in the CORESET; and/or, the terminal device may determine the PUCCH resource for transmitting the HARQ-ACK feedback information based on a position of a start CCE in the CORSET.

In embodiments of the present disclosure, the terminal device determines M non-continuous time units based on first indication information received, receives N PDSCHs transmitted by the network device based over the M non-continuous time units, and determines PUCCH resources corresponding to HARQ-ACKs of each PDSCH based on attributes of split time units between a plurality of non-continuous time unit groups, and transmits HARQ-ACK feedback information corresponding to the PUSCH to the network device based on the determined PUCCH resources. Thus, the terminal device may determine a plurality of non-continuous time units based on the first indication information, and transmit a HARQ-ACK corresponding to a PDSCH with a higher priority to the network device based on the PUCCH resources indicated, thereby effectively reducing a signaling transmission, saving resources and ensuring qualities of transmission PDSCHs with different priorities.

Figures 8, 9, 10:
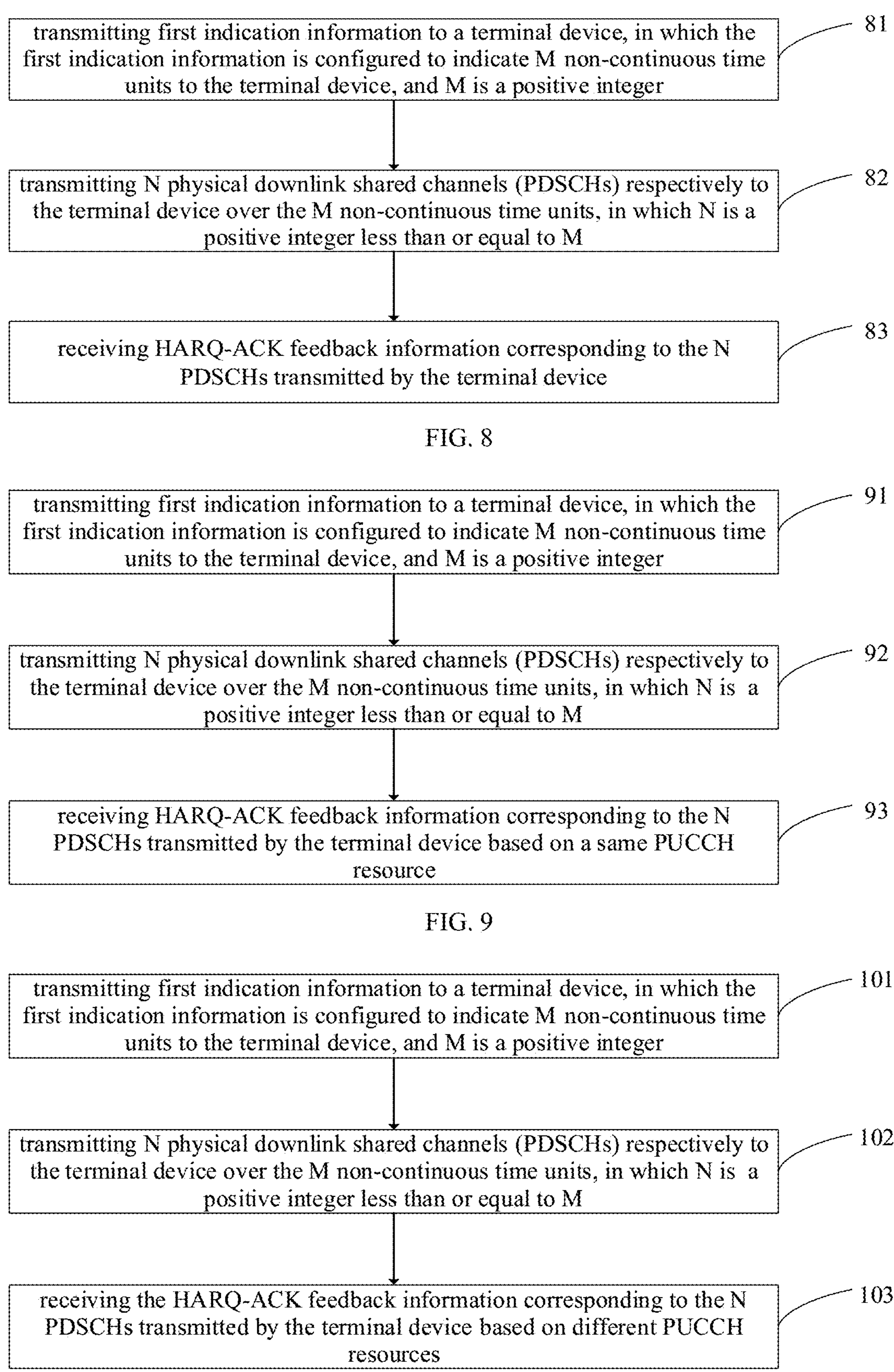
FIG. 8 is a flowchart illustrating a method for feeding back a hybrid automatic repeat request-acknowledgment (HARQ-ACK) in another embodiment of the present disclosure.
FIG. 9 is a flowchart illustrating a method for feeding back a hybrid automatic repeat request-acknowledgment (HARQ-ACK) in another embodiment of the present disclosure.
FIG. 10 is a flowchart illustrating a method for feeding back a hybrid automatic repeat request-acknowledgment (HARQ-ACK) in another embodiment of the present disclosure.

As illustrated in FIG. 8, which is a flowchart illustrating a method for feeding back a hybrid automatic repeat request-acknowledgment (HARQ-ACK) in an embodiment of the present disclosure. The method is configured to be performed by a network device. As illustrated in FIG. 8, the method may include but not limited to the following steps.

At step 81, first indication information is transmitted to a terminal device. The first indication information is configured to indicate M non-continuous time units to the terminal device. M is a positive integer.

In an implementation, the first indication information may be downlink control information (DCI), or, may be other any information that may be configured to indicate a plurality of non-continuous time units to the terminal device, which will not be limited in the present disclosure. When the first indication information is DCI, the first indication information is DCI corresponding to a DCI format for scheduling a PDSCH.

In an implementation, the M non-continuous time units may be at least one of: a downlink time unit or a flexible time unit.

That is, the DCI corresponding to the DCI format for scheduling the PDSCH may only schedule the downlink time unit and/or the flexible time unit. And the DCI corresponding to the DCI format for scheduling the PUSCH may only schedule an uplink time unit and/or the flexible time unit.

The downlink time unit may only be configured for a downlink communication transmission, and the flexible time unit is a time unit without a determined transmission direction. And when the DCI format for scheduling the PDSCH transmission schedules the flexible time unit, the flexible time unit may be used for a PDSCH transmission.

In an implementation, the time unit may be at least one of a slot, a mini-slot, a symbol or a subframe.

At step 82, N physical downlink shared channels (PDSCHs) are transmitted respectively to the terminal device over the M non-continuous time units. N a positive integer less than or equal to M.

A number N of PDSCHs transmitted by the network device over the M non-continuous time units may be less than or equal to a number of non-continuous time units, that is, the network device may transmit one PDSCH on one or more non-continuous time units, which is not limited in the disclosure.

In an implementation, each PDSCH includes at least one transmission block (TB); or, each PDSCH includes at least one transmission block (CBG). It is not limited in the present disclosure.

At step 83, HARQ-ACK feedback information corresponding to the N PDSCHs transmitted by the terminal device is received.

In an implementation, HARQ-ACKs of different TBs in each PDSCH correspond to different bits, or HARQ-ACKs of different CBGs in each PDSCH correspond to different bits.

For example, each PDSCH includes one or two TBs, in which case, a HARQ-ACK of each TB in each PDSCH occupies an independent bit. Alternatively, each PDSCH includes a plurality of CBGs, in which case, a HARQ-ACK of each CBG in each PDSCH occupies an independent bit.

In the disclosure, when the terminal device receives a plurality of non-continuous time units indicated by the network device and receives the N PDSCHs transmitted by the network device respectively based on the plurality of non-continuous time units, the terminal device may transmit HARQ-ACK feedback information indicating whether the N PDSCHs are correctly received to the network device.

In embodiments of the present disclosure, when the network device transmits first indication information to the terminal device first, the network device may transmit N PDSCHs to the terminal device based on M non-continuous time units indicated based on the first indication information, and receive HARQ-ACK feedback information corresponding to the N PDSCHs transmitted by the terminal device. Thus, the network device may indicate a plurality of non-continuous time units via the first indication information, and receive a plurality of HARQ-ACK feedbacks of the terminal device for the plurality of non-continuous time units, thereby effectively reducing a signaling transmission, thus saving resources and improving efficiency.

As illustrated in FIG. 9, which is a flowchart illustrating a method for feeding back a hybrid automatic repeat request-acknowledgment (HARQ-ACK) in an embodiment of the present disclosure. The method is configured to be performed by a network device. As illustrated in FIG. 9, the method may include but not limited to the following steps.

At step 91, first indication information is transmitted to a terminal device. The first indication information is configured to indicate M non-continuous time units to the terminal device. M is a positive integer.

In an implementation, the first indication information may be downlink control information (DCI).

In an implementation, a plurality of non-continuous time units may be at least one of: a downlink time unit or a flexible time unit.

It needs to be noted that, specific contents and implementations of the first indication information and the plurality of non-continuous time units may refer to descriptions of other embodiments, which are not limited in the disclosure.

In an implementation, a number of the plurality of non-continuous time units indicated by the first indication information is less than or equal to a certain threshold value.

Specifically, if a number of the non-continuous time units is too large, and one indication information is used for scheduling, a scheduling time may be too long, with poor flexibility, and channel state information based on scheduling may change too much, which may result in inaccuracy. Therefore, a number of the non-continuous time units indicated to the terminal device in the first indication information is limited, to reduce a signaling overhead as much as possible, and improve accuracy.

The threshold value may be a value indicated by the network device or may be a value preconfigured by the terminal device based on a protocol, which is not limited in the present disclosure.

At step 92, N PDSCHs are transmitted respectively to the terminal device over the M non-continuous time units. N is a positive integer less than or equal to M.

At step 93, the HARQ-ACK feedback information corresponding to the N PDSCHs transmitted by the terminal device is received based on a same PUCCH resource.

In an implementation, the terminal device may transmit the HARQ-ACK feedback information corresponding to the N PDSCHs to the network device based on a specified codebook in the same PUCCH resource. The HARQ-ACK feedback information corresponding to different PDSCHs corresponds to different bits or a same bit in the specified codebook.

The specified codebook may be a codebook determined by the terminal device based on a protocol or may be a codebook determined by the terminal device based on indication information of the terminal device, which is not limited in the present disclosure.

For example, when the network device transmits 5 PDSCHs to the terminal device, the terminal device may return to the network device whether each PDSCH is correctly received based on 5 bits in the specified codebook.

Alternatively, when the network device transmits 5 PDSCHs to the terminal device and each PDSCH includes 2 TBs, the terminal device may respectively return to the network device whether each TB in after each PDSCH is correctly received based on 10 bits in the specified codebook.

Alternatively, when the network device transmits 5 PDSCHs to the terminal device, the terminal device may return to the network device whether each PDSCH is correctly received based on 1 bit in the specified codebook, that is, 1 bit is used to feed back HARQ-ACK information of 5 PDSCHs. For example, if all PDSCHs are correctly received, a bit value may be set to 1, and if all PDSCHs are wrongly received, or if only one PDSCH is wrongly received, the bit value may be set to 0, which is not limited in the disclosure.

In embodiments of the present disclosure, when the network device transmits first indication information to the terminal device first, the network device may transmit N PDSCHs to the terminal device on the basis of M non-continuous time units indicated based on the first indication information, and receive HARQ-ACK feedback information corresponding to the N PDSCHs transmitted by the terminal device based on a same PUCCH resource. Thus, the network device may indicate a plurality of non-continuous time units via the first indication information, and receive a plurality of PDSCHs transmitted by the terminal device for the plurality of non-continuous time units by using the same PUCCH resource, thereby effectively reducing a signaling transmission, saving resources and improving efficiency.

As illustrated in FIG. 10, which is a flowchart illustrating a method for feeding back a hybrid automatic repeat request-acknowledgment (HARQ-ACK) in an embodiment of the present disclosure. The method is configured to be performed by a network device. As illustrated in FIG. 10, the method may include but not limited to the following steps.

At step 101, first indication information is transmitted to a terminal device. The first indication information is configured to indicate M non-continuous time units to the terminal device. M is a positive integer.

In an implementation, the first indication information may be downlink control information (DCI).

In an implementation, a plurality of non-continuous time units may be at least one of: a downlink time unit or a flexible time unit.

It needs to be noted that, specific contents of the first indication information and the plurality of non-continuous time units may refer to descriptions of other embodiments, which are not limited in the disclosure.

At step 102, N PDSCHs are transmitted respectively to the terminal device over the M non-continuous time units. N is a positive integer less than or equal to M.

At step 103, HARQ-ACK feedback information corresponding to N PDSCHs transmitted by the terminal device is received based on different PUCCH resources.

In an implementation, in the disclosure, the M non-continuous time units indicated in the first indication information may be divided into a plurality of time unit groups. Each time unit group includes x continuous time units, and a plurality of time unit groups may be continuous or non-continuous. An operation with respect to division of the M non-continuous time units into a plurality of time unit groups may be indicated to a terminal by the network device after completion, or may be performed by the terminal device based on a predefined rule and/or a rule indicated by the network device. The terminal device transmits HARQ-ACK feedback information corresponding to PDSCHs received based on different time unit groups to the network device based on different PUCCH resources when determining a plurality of time groups.

That is, the network device may also receive HARQ-ACK feedback information corresponding to a specified plurality of PDSCHs transmitted by the terminal device based on a same PUCCH resource. The time units corresponding to the specified plurality of PDSCHs belong to a same time unit group.

For example, if the first indication information transmitted by the network device indicates 10 non-continuous time units, and a 1st time unit, a 2nd time unit and a 3rd time unit are continuous, the 3rd time unit and a 4th time unit are non-continuous, the 4th time unit, a 5th time unit, a 6th time unit and a 7th time unit are continuous, the 7th time unit and an 8th time unit are non-continuous, and the 8th time unit, a 9th time unit and a 10th time unit are continuous. Thus, the network device and the terminal device may divide the 10 non-continuous time units received into 3 time unit groups, that is, a 1st time unit group includes the 1st to 3rd time units, a 2nd time unit group includes the 4th to 7th time units, and a 3rd time unit group includes the 8th to 10th time units.

Then, the terminal device may transmit HARQ-ACK feedback information corresponding to PDSCHs received by the 1st time unit group (i.e., the 1st to 3rd time units) to the network device based on one PUCCH resource; transmit HARQ-ACK feedback information corresponding to PDSCHs received by the 2nd time unit group to the network device based on another PUCCH resource; and transmit HARQ-ACK feedback information corresponding to PDSCHs received by the 3rd time unit group to the network device based on another PUCCH resource.

In an implementation, a number x of time units included in each time unit group may be same, or may be different, or may be partially same, which is not limited in the disclosure.

In an implementation, the network device may transmit an indication to the terminal device, to indicate a number x of time units included in each time unit group of the terminal device. Alternatively, the network device may determine a number of time units included in each time unit group based on a protocol. It is not limited in the present disclosure.

In an implementation, a number of time units included in each time unit group is greater than or equal to 1.

In an implementation, in the disclosure, the HARQ-ACK feedback information received by the network device on the same PUCCH resource may correspond to a PDSCH received by the terminal device on different time unit groups.

For example, the terminal device transmits HARQ-ACK feedback information corresponding to PDSCHs received by the 1st time unit group (i.e., the 1st to 3rd time units) to the network device based on a first PUCCH resource; transmit HARQ-ACK feedback information corresponding to PDSCHs received by the 2nd time unit group to the network device based on a second PUCCH resource; and transmit HARQ-ACK feedback information corresponding to PDSCHs received by the 3rd time unit group to the network device based on a third PUCCH resource. For example, the second PUCCH resource and the third PUCCH resource are a same PUCCH resource, and the first PUCCH resource and the second PUCCH resource are different PUCCH resources.

In embodiments of the present disclosure, when the network device transmits first indication information to the terminal device first, the network device may transmit N PDSCHs to the terminal device on the basis of M non-continuous time units indicated based on the first indication information, and receive HARQ-ACK feedback information corresponding to the N PDSCHs transmitted by the terminal device based on the different PUCCH resources. Thus, the network device may indicate a plurality of non-continuous time units via the first indication information, and receive a plurality of PDSCHs received by the terminal device for the plurality of non-continuous time units by using different PUCCH resources respectively for HARQ-ACK feedbacks, thereby effectively reducing a signaling transmission, saving resources and improving efficiency.

Figures 11, 12:
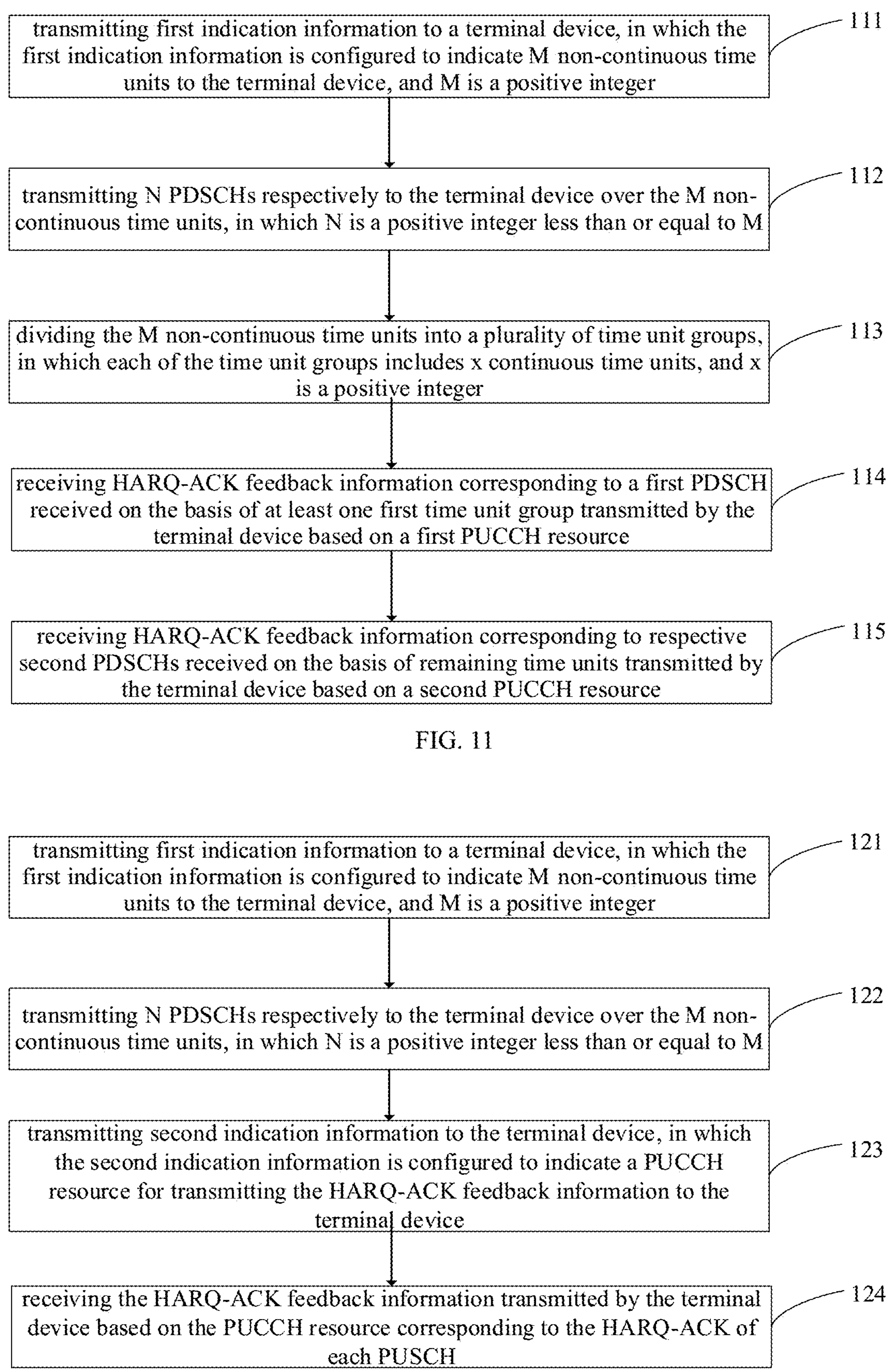
FIG. 11 is a flowchart illustrating a method for feeding back a hybrid automatic repeat request-acknowledgment (HARQ-ACK) in another embodiment of the present disclosure.
FIG. 12 is a flowchart illustrating a method for feeding back a hybrid automatic repeat request-acknowledgment (HARQ-ACK) in another embodiment of the present disclosure.

As illustrated in FIG. 11, which is a flowchart illustrating a method for feeding back a hybrid automatic repeat request-acknowledgment (HARQ-ACK) in an embodiment of the present disclosure. The method is configured to be performed by a network device. As illustrated in FIG. 11, the method may include but not limited to the following steps.

At step 111, first indication information is transmitted to a terminal device. The first indication information is configured to indicate M non-continuous time units to the terminal device. M is a positive integer.

In an implementation, the first indication information may be downlink control information (DCI).

In an implementation, a plurality of non-continuous time units may be at least one of: a downlink time unit or a flexible time unit.

It needs to be noted that, specific contents of the first indication information and the plurality of non-continuous time units may refer to descriptions of other embodiments, which are not limited in the disclosure.

At step 112, N PDSCHs are transmitted respectively to the terminal device over the M non-continuous time units. N is a positive integer less than or equal to M.

At step 113, the M non-continuous time units are divided into a plurality of time unit groups. Each of the time unit groups includes x continuous time units, and x is a positive integer.

In an implementation, each of the plurality of time unit groups is non-continuous or continuous, which is not limited in the present disclosure.

It needs to be noted that, a meaning and a division of the time unit group may refer to descriptions of other embodiments, which is not limited in the disclosure.

At step 114, HARQ-ACK feedback information corresponding to a first PDSCH received on the basis of at least one first time unit group transmitted by the terminal device is received based on a first PUCCH resource.

At step 115, HARQ-ACK feedback information corresponding to respective second PDSCHs received on the basis of remaining time units transmitted by the terminal device is received based on a second PUCCH resource.

A transmitting moment corresponding to the first PUCCH resource is located before a moment corresponding to the second PUCCH resource, and a priority of the first PUCCH is higher than a priority of each of the second PUSCHs.

In an implementation, each of the at least one first time unit group is continuous or non-continuous.

That is, priorities of a plurality of first PDSCHs that may be received by the terminal device based on a plurality of continuous first time unit groups are same, or priorities of a plurality of first PDSCHs that may be received based on a plurality of non-continuous first time unit groups are same.

In an implementation, if priorities of PDSCHs received by the network device based on different time units are different, the terminal device may preferentially ensure that HARQ-ACK feedback information corresponding to a PDSCH with a higher priority may be preferentially transmitted, so that the HARQ-ACK feedback information corresponding to the PDSCH with the higher priority may be transmitted by using a PUCCH resource at an early transmitting time, and then the HARQ-ACK feedback information corresponding to the PDSCH with the higher priority may be transmitted by using remaining PUCCH resources.

In an implementation, due to different types of service data, requirements for quality of service may be different, and for example, requirements for a delay are different. Therefore, the terminal device may determine a priority of each of the PDSCHs based on a service type corresponding to each of the PDSCHs received.

In embodiments of the present disclosure, when the network device transmits first indication information to the terminal device first, the network device may transmit N PDSCHs to the terminal device based on M non-continuous time units indicated based on the first indication information, and receive HARQ-ACK feedback information corresponding to a PDSCH with a higher priority transmitted by the terminal device based on the PUCCH resource at the early transmitting moment and receive HARQ-ACK feedback information corresponding to a PDSCH with a lower priority transmitted by the terminal device based on a PUCCH resource at a late transmitting moment. Thus, the network device may indicate a plurality of non-continuous time units based on the first indication information, and receive a HARQ-ACK corresponding to the PDSCH with the higher priority by using the PUCCH resource at the early transmitting moment, thereby effectively reducing a signaling transmission, saving resources and ensuring qualities of service of PDSCHs with different priorities.

As illustrated in FIG. 12, which is a flowchart illustrating a method for feeding back a hybrid automatic repeat request-acknowledgment (HARQ-ACK) in an embodiment of the present disclosure. The method is configured to be performed by a network device. As illustrated in FIG. 12, the method may include but not limited to the following steps.

At step 121, first indication information is transmitted to a terminal device. The first indication information is configured to indicate M non-continuous time units to the terminal device. M is a positive integer.

In an implementation, the first indication information may be downlink control information (DCI).

In an implementation, a plurality of non-continuous time units may be at least one of: a downlink time unit or a flexible time unit.

It needs to be noted that, specific contents of the first indication information and the plurality of non-continuous time units may refer to descriptions of other embodiments, which are not limited in the disclosure.

At step 122, N PDSCHs are transmitted respectively to the terminal device over the M non-continuous time units. N is a positive integer less than or equal to M.

At step 123, second indication information is transmitted to the terminal device. The second indication information is configured to indicate a PUCCH resource for transmitting the HARQ-ACK feedback information to the terminal device.

At step 124, the HARQ-ACK feedback information transmitted by the terminal device is received based on the PUCCH resource corresponding to the HARQ-ACK of each PUSCH.

In an implementation, a PUCCH resource indicated by the second indication information may be one or more resources. That is, the terminal device may transmit HARQ-ACK feedback information corresponding to N PDSCHs to the network device based on one PUCCH resource; or may transmit HARQ-ACK feedback information corresponding to the N PDSCHs to the network device based on a plurality of PUCCH resources. It is not limited in the present disclosure.

In an implementation, the second indication information is first indication information, or the second indication information is other indication information other than the first indication information.

In embodiments of the present disclosure, the network device indicates M non-continuous time units to the terminal device via one piece of first indication information first, transmits N PDSCHs to the terminal device based over the M non-continuous time units, and indicates PUCCH resources corresponding to HARQ-ACKs of each PDSCH to the terminal device via second indication information received, and receives HARQ-ACK feedback information corresponding to the PUSCH transmitted by the terminal device based on the indicated PUCCH resources. Thus, the network device may indicate a plurality of non-continuous time units via the first indication information, and receive a HARQ-ACK corresponding to a PDSCH transmitted by the terminal device based on the PUCCH resources indicated, thereby reducing a signaling transmission effectively, saving resources, improving efficiency and ensuring reliable transmission of the HARQ-ACK.

In embodiments provided in the disclosure, methods provided in embodiments of the present disclosure are introduced mainly from the perspective of the network device and the terminal device. To achieve various functions in the methods provided in embodiments of the disclosure, the network device and the terminal device may include a hardware structure and a hardware module, to achieve the above functions in the form of the hardware structure, the hardware module or a combination of the hardware structure and the hardware module. A certain function in the above functions may be performed by the hardware structure, the hardware module or a combination of the hardware structure and the hardware module.

Figure 13:
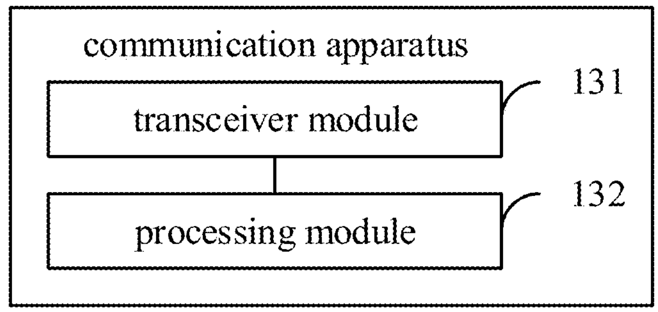
FIG. 13 is a diagram illustrating a structure of a communication apparatus in an embodiment of the present disclosure.

As illustrated in FIG. 13, which is a diagram illustrating a structure of a communication apparatus 130 provided in embodiments of the present disclosure. The communication apparatus 130 as illustrated in FIG. 13 may include a transceiver module 131 and a processing module 132.

The transceiver module 131 may include a transmitting module and/or a receiving module. The transmitting module is configured to implement a transmitting function, the receiving module is configure to implement a receiving function, and the transceiver module 131 may implement a transmitting function and/or a receiving function.

It is understood that the communication apparatus 130 may be a terminal device, an apparatus in the terminal device, or an apparatus capable of being used with the terminal device.

The communication apparatus 130 is configured on a terminal device side. The apparatus includes a transceiver module 131.

The transceiver module 131 is configured to receive first indication information from a network device. The first indication information is configured to indicate M non-continuous time units to the terminal device.

The transceiver module 131 is further configured to receive N physical downlink shared channels (PDSCHs) transmitted by the network device respectively over the M non-continuous time units.

The transceiver module 131 is further configured to transmit HARQ-ACK feedback information corresponding to the N PDSCHs to the network device.

M and N are positive integers greater than 1, and N is less than or equal to M.

In an implementation, the time unit is at least one of a slot, a mini-slot, a symbol or a subframe.

In an implementation, the first indication information is downlink control information (DCI).

In an implementation, each PDSCH includes at least one transmission block (TB); or, each PDSCH includes at least one code block group (CBG).

In an implementation, HARQ-ACKs of different TBs in each PDSCH correspond to different bits; or HARQ-ACKs of different CBGs in each PDSCH correspond to different bits.

In an implementation, the transceiver module 131 is specifically configured to transmit the HARQ-ACK feedback information corresponding to the N PDSCHs to the network device based on a same physical uplink control channel (PUCCH) resource.

In an implementation, the transceiver module 131 is specifically configured to transmit the HARQ-ACK feedback information corresponding to the N PDSCHs to the network device based on a specified codebook in the PUCCH resource. The HARQ-ACK feedback information corresponding to different PDSCHs corresponds to different bits or a same bit in the specified codebook.

In an implementation, the transceiver module 131 is specifically configured to transmit the HARQ-ACK feedback information corresponding to the N PDSCHs to the network device based on different PUCCH resources.

In an implementation, the transceiver module 131 is specifically configured to transmit the HARQ-ACK feedback information corresponding to the PDSCHs received on the basis of different time unit groups to the network device based on the different PUCCH resources. Each of the different time unit groups includes x continuous time units, and x is a positive integer.

In an implementation, the different time unit groups are non-continuous.

In an implementation, the transceiver module 131 is further configured to transmit HARQ-ACK feedback information corresponding to a specified plurality of PDSCHs to the network device based on a same PUCCH resource. The time units corresponding to the specified plurality of PDSCHs belong to a same time unit group.

In an implementation, the transceiver module 131 is specifically configured to:

transmit HARQ-ACK feedback information corresponding to a first PDSCH received on the basis of at least one first time unit group to the network device based on a first PUCCH resource; and transmit HARQ-ACK feedback information corresponding to respective second PDSCHs received on the basis of remaining time units to the network device based on a second PUCCH resource.

A transmitting moment corresponding to the first PUCCH resource is located before a transmitting moment corresponding to the second PUCCH resource. A priority of the first PUCCH is higher than a priority of each of the second PUSCHs. Each of the time unit groups includes x continuous time units, and x is a positive integer.

In an implementation, the different time unit groups are non-continuous.

In an implementation, the processing module 132 is specifically configured to: determine a priority of each of the PDSCHs based on a service type corresponding to each of the PDSCHs received.

In an implementation, the transceiver module 131 is further configured to receive second indication information from a network device. The second indication information is configured to indicate a PUCCH resource for transmitting the HARQ-ACK feedback information.

In an implementation, the processing module 132 is specifically configured to determine a PUCCH resource for transmitting the HARQ-ACK feedback information based on the control resource set (CORESET);

or, determine a PUCCH resource for transmitting the HARQ-ACK feedback information based on attributes of split time units between a plurality of non-continuous time unit groups indicated based on the first indication information.

In an implementation, the processing module 132 is specifically configured to:

determine the PUCCH resource for transmitting the HARQ-ACK feedback information based on a number of control channel elements (CCEs) in the CORSET;

and/or, determine the PUCCH resource for transmitting the HARQ-ACK feedback information based on a position of a start CCE in the CORSET.

In an implementation, the processing module 132 is specifically configured to:

in response to any one time unit group being a time unit group corresponding to a PDSCH required to feed back the HARQ-ACK, and each time unit located behind the any one time unit group being a non-downlink time unit, determine the non-downlink time unit as a time unit corresponding to the PUCCH resource;

or, in response to any one time unit group being a time unit group corresponding to a PDSCH required to feed back the HARQ-ACK, and a plurality of time units located behind the any one time unit group including a plurality of non-downlink time units, determine a first non-downlink time unit in the plurality of non-downlink time units as a time unit corresponding to the PUCCH resource; or, in response to any one time unit group being a time unit group corresponding to a PDSCH required to feed back the HARQ-ACK, and a plurality of time units located behind the any one time unit group being non-downlink time units, determine a non-downlink time unit with a time interval from the any one time unit group being greater than or equal to a specified value and being minimum as a time unit corresponding to the PUCCH resource.

In an implementation, the processing module 132 is further configured to:

determine the specified value based on a performance of the terminal device;

or, determine the specified value based on third indication information;

or, determine the specified value based on a protocol.

In the communication apparatus in the present disclosure, when the terminal device receives first indication information from the network device, the terminal device may receive N PDSCHs transmitted by the network device on the basis of M non-continuous time units indicated based on the first indication information, and transmit HARQ-ACK feedback information corresponding to the N PDSCHs to the network device. Thus, the terminal device may determine a plurality of non-continuous time units based on the first indication information, and perform HARQ-ACK feedbacks for a plurality of PDSCHs received for the plurality of non-continuous time units, thereby effectively reducing a signaling transmission, saving resources and improving efficiency.

In an implementation, the communication apparatus 130 may be further configured on a network device side.

Correspondingly, the transceiver module 131 is configured to transmit first indication information to the terminal device. The first indication information is configured to indicate M non-continuous time units to the terminal device.

The transceiver module 131 is further configured to transmit N physical downlink shared channels (PDSCHs) to the terminal device respectively over the M non-continuous time units.

The transceiver module 131 is further configured to receive HARQ-ACK feedback information corresponding to the N PDSCHs transmitted by the terminal device.

M and N are positive integers greater than 1, and N is less than or equal to M.

In an implementation, the time unit is at least one of a slot, a mini-slot, a symbol or a subframe.

In an implementation, the first indication information is downlink control information (DCI).

In an implementation, each PDSCH includes at least one transmission block (TB); or, each PDSCH includes at least one code block group (CBG).

In an implementation, HARQ-ACKs of different TBs in each PDSCH correspond to different bits;

or,

HARQ-ACKs of different CBGs in each PDSCH correspond to different bits.

In an implementation, the transceiver module 131 is specifically configured to receive the HARQ-ACK feedback information corresponding to the N PDSCHs transmitted by the terminal device based on a same physical uplink control channel (PUCCH) resource.

In an implementation, the transceiver module 131 is specifically configured to receive the HARQ-ACK feedback information corresponding to the N PDSCHs transmitted by the terminal device based on a specified codebook in the PUCCH resource. The HARQ-ACK feedback information corresponding to different PDSCHs corresponds to different bits or a same bit in the specified codebook.

In an implementation, the transceiver module 131 is specifically configured to receive the HARQ-ACK feedback information corresponding to the N PDSCHs transmitted by the terminal device based on different PUCCH resources.

In an implementation, the transceiver module 131 is specifically configured to receive the HARQ-ACK feedback information corresponding to the PDSCHs received on the basis of different time unit groups transmitted by the terminal device based on the different PUCCH resources. Each of the different time unit groups includes X continuous time units, and x is a positive integer.

In an implementation, the different time unit groups are non-continuous.

In an implementation, the transceiver module 131 may be further configured to receive HARQ-ACK feedback information corresponding to a specified plurality of PDSCHs transmitted by the terminal device based on a same PUCCH resource. The time units corresponding to the specified plurality of PDSCHs belong to a same time unit group.

In an implementation, the transceiver module 131 is further configured to:

receive HARQ-ACK feedback information corresponding to a first PDSCH received on the basis of at least one first time unit group transmitted by the terminal device based on a first PUCCH resource; and receive HARQ-ACK feedback information corresponding to respective second PDSCHs received on the basis of remaining time units transmitted by the terminal device based on a second PUCCH resource.

A transmitting moment corresponding to the first PUCCH resource is located before a transmitting moment corresponding to the second PUCCH resource. A priority of the first PUCCH is higher than a priority of each of the second PUSCHs. Each of the time unit groups includes x continuous time units, and x is a positive integer.

In an implementation, the different time unit groups are non-continuous.

In an implementation, the transceiver module 131 is further configured to transmit second indication information to the terminal device. The second indication information is configured to indicate a PUCCH resource for transmitting HARQ-ACK feedback information to the terminal device.

In the communication apparatus provided in the present disclosure, when the network device transmits first indication information to the terminal device first, the network device may transmit N PDSCHs to the terminal device based on M non-continuous time units indicated based on the first indication information, and receive HARQ-ACK feedback information corresponding to the N PDSCHs transmitted by the terminal device. Thus, the network device may indicate a plurality of non-continuous time units via the first indication information, and receive a plurality of HARQ-ACK feedbacks of the terminal device for the plurality of non-continuous time units, thereby effectively reducing a signaling transmission, thus saving resources and improving efficiency.

Figure 14:
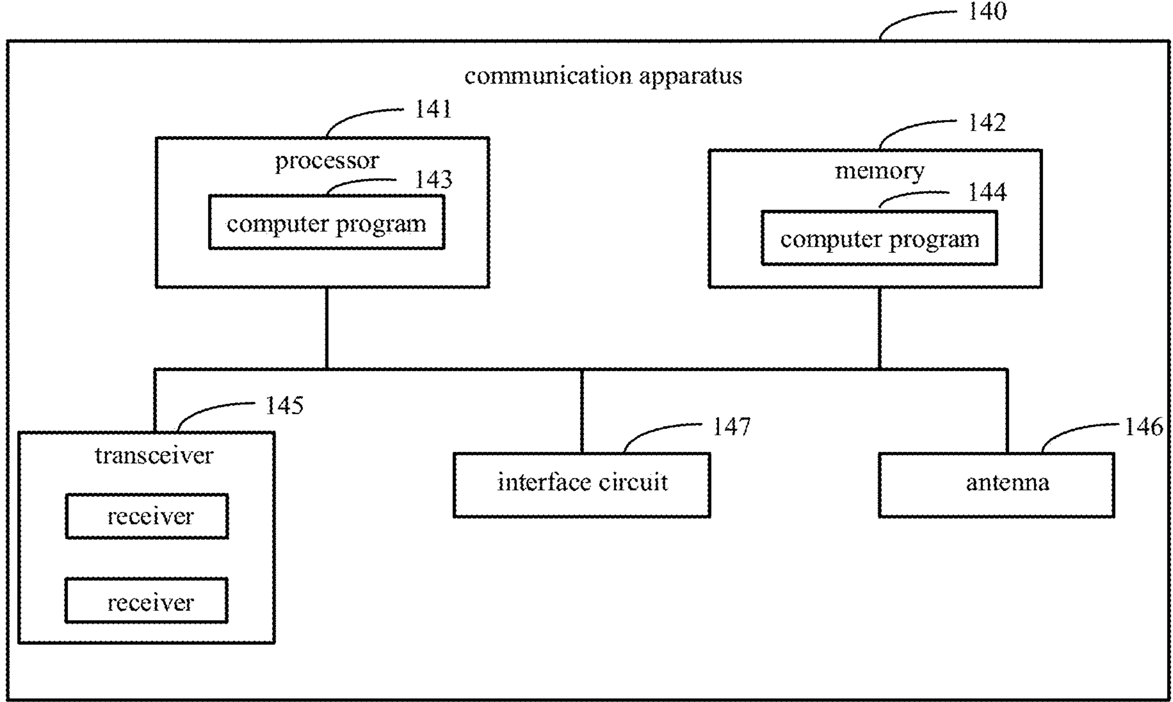
FIG. 14 is a diagram illustrating a structure of a communication apparatus in another embodiment of the present disclosure.

As illustrated in FIG. 14, which is a diagram illustrating a structure of another communication apparatus 140 provided in embodiments of the present disclosure. The communication apparatus 140 may be a network device, a terminal device, a chip, a system on chip or a processor that supports the network device to implement the method, or a chip, a system on chip or a processor that supports the terminal device to implement the method. The device may be configured to implement the method described in the method embodiments, and may refer to descriptions in the method embodiments.

The communication apparatus 140 may include one or more processors 141. The processor 141 may include a general purpose processor or a dedicated processor. For example, the processor 141 may be a baseband processor or a central processor. The baseband processor may be configured to process a communication protocol and communication data, and the central processor may be configured to control a communication apparatus (e.g., a base station, a baseband chip, a terminal device, a terminal device chip, a DU or CU, etc.), to execute a computer program, and process data of the computer program.

In an implementation, the communication apparatus 140 may further include one or more memories 142 with a computer program 143 stored thereon. The processor 140 executes the computer program 143 so that the communication apparatus 140 performs the method as described in the above method embodiments. In an implementation, the memory may further store data. The communication apparatus 140 and the memory 142 may be independently configured or integrated together.

In an implementation, the communication apparatus 140 may further include a transceiver 145 and an antenna 146. The transceiver 145 may be referred to as a transceiving unit, a transceiver or a transceiving circuit, which may be configured to achieve a transceiving function. The transceiver 145 may include a receiver and a transmitter. The receiver may be referred to as a receiver or a receiving circuit, etc., for implementing a receiving function; the transmitter may be referred to as a transmitter or a transmission circuit, etc. for implementing a transmission function.

In an implementation, the communication apparatus 140 may further include one or more interface circuits 147. The interface circuit 147 is configured to receive code instructions and transmit the code instructions to the processor 141. The processor 141 runs the code instructions so that the communication apparatus 140 performs the method as described in the above method embodiment.

The communication apparatus 140 is a terminal device: and the processor 141 is configured to execute step 64 in FIG. 6; and execute step 73, step 7, etc. in FIG. 7. The transceiver 145 is configured to execute steps 21 and 22 in FIG. 2; execute steps 31 and 32 in FIG. 3; and execute step 41, step 42, step 43, etc. in FIG. 4.

The communication apparatus 140 is a network device: the transceiver 145 is configured to execute steps 91 and 92 in FIG. 9; and execute steps 101 and 102, etc. in FIG. 10.

In an implementation, the processor 141 may include a transceiver configured to implement receiving and transmitting functions. For example, the transceiver may be a transceiving circuit, or an interface, or an interface circuit. The transceiving circuit, the interface or the interface circuit configured to implement receiving and transmitting functions may be separate or integrated together. The transceiving circuit, the interface or the interface circuit may be configured to read and write codes/data, or the transceiving circuit, the interface or the interface circuit may be configured to transmit or deliver a signal.

In an implementation, the processor 141 may be stored with a computer program 143. The computer program 143 runs on the processor 141 so that the communication apparatus 140 performs the method as described in the above method embodiments. The computer program 143 may be solidified in the processor 141, in which case the processor 141 may be implemented by a hardware.

In an implementation, the communication apparatus 140 may include a circuit that may implement a transmitting or receiving or communication function in the above method embodiments. The processor and the transceiver described in the disclosure may be implemented on integrated circuits (ICs), analog ICs, radio frequency integrated circuits (RFICs), mixed signal ICs, application specific integrated circuits (ASICs), printed circuit boards (PCBs), electronic devices, etc. The processor and the transceiver may also be fabricated by using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon germanium (SiGe) and gallium arsenide (GaAs).

The communication apparatus described in the above embodiments may be a network device or a terminal device, but the scope of the communication apparatus described in the present disclosure is not limited thereto, and a structure of the communication apparatus may not be subject to FIG. 14. The communication apparatus may be a stand-alone device or may be a part of a larger device. For example, the communication apparatus may be:

(1) a stand-alone integrated circuit (IC), or a chip, or a system on chip or a subsystem;

(2) a set of one or more ICs, which, in an implementation, may also include a storage component configured to store data and a computer program;

(3) an ASIC, such as a Modem;

(4) a module that may be embedded within other devices;

(5) a receiver, a terminal device, a smart terminal device, a cellular phone, a wireless device, a handset, a mobile unit, an in-vehicle device, a network device, a cloud device, an artificial intelligence device, etc.; and (6) others, and so forth.

Figure 15:
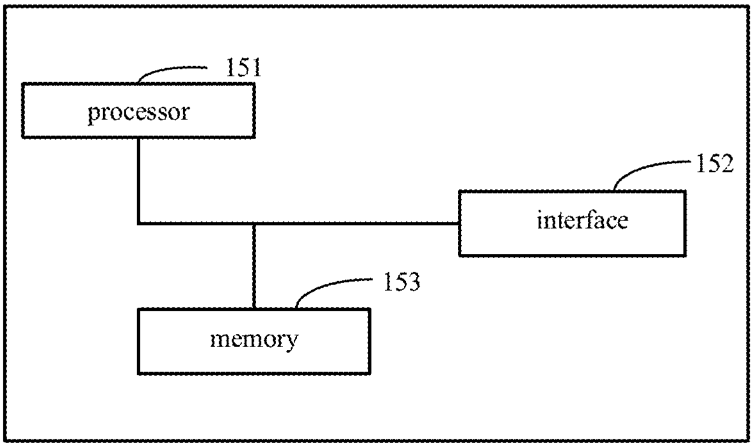
FIG. 15 is a structure of a chip in an embodiment of the present disclosure.

For the case that the communication apparatus may be a chip or a system on chip, please refer to a diagram of a structure of a chip as illustrated in FIG. 15. The chip illustrated in FIG. 15 may include a processor 151 and an interface 152. There may be one or more processors 151, and there may be a plurality of interfaces 152.

For the case that the chip is configured to implement a function of a terminal device in embodiments of the disclosure, the interface 152 is configured to execute steps 21 and 22 in FIG. 2; execute steps 31 and 32 in FIG. 3; and execute steps 41 to 43, etc. in FIG. 2.

For the case that the chip is configured to implement a function of a network device in embodiments of the disclosure, the interface 152 is configured to execute steps 91 and 92 in FIG. 9; and execute steps 101 and 102, etc. in FIG. 10. In an implementation, the chip further includes a memory 153. The memory 153 is configured to save a necessary computer program and data.

Those skilled in the related art may understand that, various illustrative logical blocks and steps listed in embodiments of the present disclosure, may be implemented by an electronic hardware, a computer software or a combination of an electronic hardware and a computer software. Whether the function is implemented by the hardware or the software depends on specific applications and design requirements for an overall system. Those skilled in the art may implement the functions by using various methods for each specific application, but such an implementation should not be understood as beyond the protection scope of embodiments of the present disclosure.

A system for feeding back a hybrid automatic repeat request-acknowledgment (HARQ-ACK) is further provided in embodiments of the disclosure. The system includes a communication apparatus serving as a terminal device in the embodiments of FIG. 10 and a communication apparatus serving as a network device in embodiments of FIG. 11, or the system includes a communication apparatus serving as a terminal device and a communication apparatus serving as a network device in embodiments of FIG. 12.

A readable storage medium with instructions stored thereon is further provided in the disclosure. When the instructions are executed by a computer, steps in the any one method embodiment are implemented.

A computer program product is further provided. The computer program product implements functions of the above any one method embodiment when executed by a processor.

In the above embodiments, the functions may be wholly or partially implemented by a software, a hardware, a firmware, or any combination thereof. When implemented by a software, the functions may be implemented in whole or in part in the form of a computer program product. The computer program product includes one or more computer programs. Procedures or functions according to embodiments of the present disclosure are wholly or partially generated when the computer program is loaded and executed on a computer. The computer may be a general purpose computer, a special purpose computer, a computer network, or other programmable device. The computer program may be stored in a computer-readable storage medium or transmitted from one computer-readable storage medium to another. For example, the computer program may be transmitted from one website, computer, server, or data center to another in a wire (e.g., a coaxial cable, an optical fiber, a digital subscriber line (DSL)) or wireless (e.g., infrared, wireless, microwave) manner. The computer-readable storage medium may be any available medium that may be accessed by a computer or a data storage device, such as a server and a data center, that integrates one or more available media. The available media may be magnetic media (e.g., floppy disks, hard disks, magnetic tapes), optical media (e.g., high-density digital video discs (DVDs)), or semiconductor media (e.g., solid state disks, SSD)) etc.

Those skilled in the art may understand that various numbers such as first and second involved in the disclosure are distinguished merely for convenience of description, and are not intended to limit the scope of embodiments of the disclosure, but also to indicate an order of precedence.

At least one in the present disclosure may also be described as one or more, and a plurality of may be two, three, four or more, which is not limited in the present disclosure. In embodiments of the present disclosure, for a kind of technical feature, technical features in the kind of technical feature are distinguished by "first", "second", "third", "A", "B", "C" and "D", and there is no order of precedence or magnitude between technical features described in "first", "second", "third", "A", "B", "C" and "D".

Corresponding relationships indicated by tables in the present disclosure may be configured or predefined. Values of information in tables are only examples, and may be configured as other values, which are not limited in the disclosure. When corresponding relationships between information and parameters are configured, it is not always necessary to configure all corresponding relationships indicated in tables. For example, in the tables in the present disclosure, corresponding relationships indicated by some rows may not be configured. For another example, appropriate transformations and adjustments, such as splitting and merging, may be made based on the above tables. Names of parameters shown in headers in the tables may be other names understandable by the communication apparatus, and values or representations of the parameters may be other values or representations understandable by the communication apparatus. When the above tables are implemented, other data structures may be used, and for example, arrays, queues, containers, stacks, linear lists, pointers, linked lists, trees, graphs, structures, classes, heaps or hash tables may be used.

Predefined in the disclosure may be understood as defined, predefined, stored, pre-stored, pre-negotiated, preconfigured, solidified or pre-fired.

Those skilled in the related art may realize that, the units and algorithm steps of each example described in conjunction with the embodiments disclosed herein can be implemented in an electronic hardware or a combination of an electronic hardware and a computer software. Whether the functions are executed by the hardware or the software depends on a specific application and a design constraint of the technical solution. Those skilled in the art may adopt different methods for each specific application to implement the described functions, but such implementation should not be considered beyond the scope of the present disclosure.

Those skilled in the art may clearly understand that, specific working processes of systems, apparatuses and units described above may refer to corresponding processes in the above method embodiments, which will not be repeated here.

The above are only implementations of the disclosure, but the protection scope of the disclosure is not limited thereto. Any changes or substitutions that may be easily considered by those skilled in the art within the scope of the present disclosure should be covered by the scope of protection of the disclosure. Therefore, the protection scope of the present disclosure should be subject to the protection scope of claims.

What is claimed is:

1. A method for feeding back a hybrid automatic repeat request-acknowledgment (HARQ-ACK), performed by a terminal device, comprising:

receiving first indication information, wherein the first indication information is configured to indicate M non-continuous time units;

receiving N physical downlink shared channels (PDSCHs) respectively over the M non-continuous time units; and transmitting HARQ-ACK feedback information corresponding to the N PDSCHs;

wherein transmitting the HARQ-ACK feedback information corresponding to the N PDSCHs comprises:

transmitting the HARQ-ACK feedback information corresponding to the N PDSCHs based on a specified codebook in a same physical uplink control channel (PUCCH) resource, wherein HARQ-ACK feedback information corresponding to different PDSCHs correspond to different bits or a same bit in the specified codebook; or transmitting the HARQ-ACK feedback information corresponding to the N PDSCHs based on different PUCCH resources, wherein a number of the different PUCCH resources is same as a number of time unit groups into which the M non-continuous time units are divided, wherein M and N are positive integers greater than 1, and N is less than or equal to M.

2. The method according to claim 1, wherein a time unit is at least one of: a slot, a mini-slot, a symbol or a subframe.

3. The method according to claim 1, wherein the first indication information is downlink control information (DCI).

4. The method according to claim 1, wherein each PDSCH comprises at least one transmission block (TB); or each PDSCH comprises at least one code block group (CBG).

5. The method according to claim 4, wherein

HARQ-ACKs of different TBs in each PDSCH correspond to different bits; or

HARQ-ACKs of different CBGs in each PDSCH correspond to different bits.

6. The method according to claim 1, wherein transmitting the HARQ-ACK feedback information corresponding to the N PDSCHs based on the different PUCCH resources, comprises:

transmitting the HARQ-ACK feedback information corresponding to the PDSCHs received on the basis of different time unit groups based on the different PUCCH resources, wherein each of the different time unit groups comprises x continuous time units, and x is a positive integer, wherein the different time unit groups are non-continuous.

7. The method according to claim 6, further comprising:

transmitting HARQ-ACK feedback information corresponding to a specified plurality of PDSCHs based on a same PUCCH resource, wherein the time units corresponding to the specified plurality of PDSCHs belong to a same time unit group;

wherein transmitting the HARQ-ACK feedback information corresponding to the N PDSCHs based on the different PUCCH resources, comprises: transmitting HARQ-ACK feedback information corresponding to a first PDSCH received on the basis of at least one first time unit group based on a first PUCCH resource; and transmitting HARQ-ACK feedback information corresponding to respective second PDSCHs received on the basis of remaining time units based on a second PUCCH resource;

wherein a transmitting moment corresponding to the first PUCCH resource is located before a transmitting moment corresponding to the second PUCCH resource, and a priority of the first PUCCH is higher than a priority of each of the second PUSCHs, and each of the time unit groups comprises x continuous time units, wherein x is a positive integer;

wherein the method further comprises: determining a priority of each of the PDSCHs based on a service type corresponding to each of the PDSCHs received;

wherein the method further comprises: receiving second indication information, wherein the second indication information is configured to indicate a PUCCH resource for transmitting the HARQ-ACK feedback information;

wherein the method further comprises: determining a PUCCH resource for transmitting the HARQ-ACK feedback information based on a control resource set (CORESET); or determining a PUCCH resource for transmitting the HARQ-ACK feedback information based on attributes of split time units between a plurality of non-continuous time unit groups indicated based on the first indication information, wherein determining the PUCCH resource for transmitting the HARQ-ACK feedback information based on the control resource set (CORESET) comprises at least one of: determining the PUCCH resource for transmitting the HARQ-ACK feedback information based on a number of control channel elements (CCEs) in the CORSET; or determining the PUCCH resource for transmitting the HARQ-ACK feedback information based on a position of a start CCE in the CORSET;

wherein the method further comprises one of:

in response to any one time unit group being a time unit group corresponding to a PDSCH required to feed back the HARQ-ACK, and each time unit located behind the any one time unit group being a non-downlink time unit, determining the non-downlink time unit as a time unit corresponding to the PUCCH resource;

in response to any one time unit group being a time unit group corresponding to a PDSCH required to feed back the HARQ-ACK, and a plurality of time units located behind the any one time unit group comprising a plurality of non-downlink time units, determining a first non-downlink time unit in the plurality of non-downlink time units as a time unit corresponding to the PUCCH resource; or in response to any one time unit group being a time unit group corresponding to a PDSCH required to feed back the HARQ-ACK, and a plurality of time units located behind the any one time unit group being non-downlink time units, determining a non-downlink time unit with a time interval from the any one time unit group being greater than or equal to a specified value and being minimum as a time unit corresponding to the PUCCH resource;

wherein the method further comprises one of:

determining the specified value based on a performance of the terminal device;

determining the specified value based on third indication information; or determining the specified value based on a protocol.

8. A method for feeding back a hybrid automatic repeat request-acknowledgment (HARQ-ACK), performed by a network device, comprising:

transmitting first indication information, wherein the first indication information is configured to indicate M non-continuous time units;

transmitting N physical downlink shared channels (PDSCHs) respectively over the M non-continuous time units; and receiving HARQ-ACK feedback information corresponding to the N PDSCHs;

wherein receiving the HARQ-ACK feedback information corresponding to the N PDSCHs comprises:

receiving the HARQ-ACK feedback information corresponding to the N PDSCHs based on a specified codebook in a same physical uplink control channel (PUCCH) resource, wherein HARQ-ACK feedback information corresponding to different PDSCHs correspond to different bits or a same bit in the specified codebook; or receiving the HARQ-ACK feedback information corresponding to the N PDSCHs based on different PUCCH resources, wherein a number of the different PUCCH resources is same as a number of time unit groups into which the M non-continuous time units are divided, wherein M and N are positive integers greater than 1, and N is less than or equal to M.

9. The method according to claim 8, wherein a time unit is at least one of: a slot, a mini-slot, a symbol or a subframe.

10. The method according to claim 8, wherein the first indication information is downlink control information (DCI).

11. The method according to claim 8, wherein each PDSCH comprises at least one transmission block (TB); or each PDSCH comprises at least one code block group (CBG).

12. The method according to claim 11, wherein

HARQ-ACKs of different TBs in each PDSCH correspond to different bits; or

HARQ-ACKs of different CBGs in each PDSCH correspond to different bits.

13. The method according to claim 8, wherein receiving the HARQ-ACK feedback information corresponding to the N PDSCHs based on the different PUCCH resources, comprises:

receiving the HARQ-ACK feedback information corresponding to the PDSCHs received on the basis of different time unit groups based on the different PUCCH resources, wherein each of the different time unit groups comprises x continuous time units, and x is a positive integer, wherein the different time unit groups are non-continuous.

14. A terminal device, comprising:

a processor; and a memory storing instructions executable by the processor, wherein the processor is configured to:

receive first indication information, wherein the first indication information is configured to indicate M non-continuous time units;

receive N physical downlink shared channels (PDSCHs) respectively over the M non-continuous time units; and transmit hybrid automatic repeat request-acknowledgment (HARQ-ACK) feedback information corresponding to the N PDSCHs;

wherein the processor is further configured to:

transmit the HARQ-ACK feedback information corresponding to the N PDSCHs based on a specified codebook in a same physical uplink control channel (PUCCH) resource, wherein HARQ-ACK feedback information corresponding to different PDSCHs correspond to different bits or a same bit in the specified codebook; or transmit the HARQ-ACK feedback information corresponding to the N PDSCHs based on different PUCCH resources, wherein a number of the different PUCCH resources is same as a number of time unit groups into which the M non-continuous time units are divided, wherein M and N are positive integers greater than 1, and N is less than or equal to M.

* * * * *